United States Patent [19]
Limberg

[11] Patent Number: 6,061,096
[45] Date of Patent: May 9, 2000

[54] DIGITAL-AND-ANALOG-TV-SIGNAL RECEIVERS, EACH WITH SINGLE FIRST DETECTOR AND SHARED HIGH-BAND I-F AMPLIFICATION

[75] Inventor: Allen LeRoy Limberg, Fairfax County, Va.

[73] Assignee: Samsung Electronics Co., Ltd., Kyungki-do, Rep. of Korea

[21] Appl. No.: 08/820,193

[22] Filed: Mar. 19, 1997

[51] Int. Cl.[7] ............................... H04N 5/44; H04N 5/38
[52] U.S. Cl. .......................... 348/555; 348/725; 348/607; 348/737; 348/729; 375/216; 375/217; 455/553
[58] Field of Search .................................... 348/725, 729, 348/726, 731, 732, 733, 735, 21, 470, 558, 554, 555, 737, 721, 738, 607, 736; 375/216, 217, 348, 350; 455/553; H04N 5/44

[56] References Cited

U.S. PATENT DOCUMENTS

| | | | |
|---|---|---|---|
| 5,283,653 | 2/1994 | Citta | 348/725 |
| 5,410,568 | 4/1995 | Schilling | 370/342 |
| 5,479,449 | 12/1995 | Patel et al. | 375/316 |
| 5,507,025 | 4/1996 | Rodeffer | 455/266 |
| 5,565,932 | 10/1996 | Citta et al. | 348/678 |
| 5,638,054 | 6/1997 | Davis et al. | 340/825.44 |
| 5,638,140 | 6/1997 | Krishnamurthy et al. | 348/735 |
| 5,715,012 | 2/1998 | Patel et al. | 348/555 |
| 5,737,035 | 4/1998 | Rotzoll | 348/725 |
| 5,786,870 | 7/1998 | Limberg | 348/607 |
| 5,801,759 | 9/1998 | Limberg | 348/21 |
| 5,801,790 | 9/1998 | Limberg | 348/607 |
| 5,805,241 | 9/1998 | Limberg | 348/725 |
| 5,832,024 | 11/1998 | Schotz | 375/200 |
| 5,841,814 | 11/1998 | Cupo | 375/321 |
| 5,852,476 | 12/1998 | Limberg | 348/725 |
| 5,857,004 | 1/1999 | Abe | 375/344 |
| 5,923,378 | 7/1999 | Limberg | 348/555 |
| 5,933,200 | 8/1999 | Han | 348/725 |

*Primary Examiner*—John K. Peng
*Assistant Examiner*—Wesner Sajous
*Attorney, Agent, or Firm*—Sughrue, Mion, Zinn, Macpeak & Seas, PLLC

[57] ABSTRACT

Radio receivers for receiving DTV signals, in accordance with the Advanced Television System Committee (ATSC) standard, or analog TV, in accordance with the National Television Systems Committee (NTSC) standard, each use a single first detector for both types of signal. This single is followed with an intermediate-frequency amplifier providing amplification both for digital television signal and for the amplitude-modulated NTSC video carrier of an analog television signal. Preferably, the shared intermediate-frequency amplifier is a high-band intermediate-frequency amplifier having fixed gain and having its bandwidth determined using a surface-acoustic-wave filter with flat-amplitude midband response, steep-slope skirts, and linear phase throughout its passband. A second mixer, which downconverts the high-band intermediate-frequency amplifier response to a low-band intermediate-frequency signal, is followed by a respective low-band intermediate-frequency amplifier for digital television signal and a respective low-band intermediate-frequency amplifier for the amplitude-modulated NTSC video carrier of an analog television signal. The respective low-band intermediate-frequency amplifier for digital television signal employs automatic gain control of reverse type and avoids automatic gain control of forward type in order to maintain linearity of gain. The respective low-band intermediate-frequency amplifier for the amplitude-modulated NTSC video carrier employs automatic gain control of forward type in order to keep noise figure lower.

51 Claims, 9 Drawing Sheets

DIGITAL-AND-ANALOG-TV-SIGNAL RECEIVERS, EACH WITH SINGLE FIRST DETECTOR AND SHARED HIGH-BAND I-F AMPLIFICATION

The present invention relates to the radio receiver portions of television (TV) signal receivers for receiving terrestrial through-the-air television broadcasting in the United States of America whether the received signals be digital television signals, in accordance with the Advanced Television Systems Committee (ATSC) standard, or analog television signals, in accordance with the National Television System Committee (NTSC) standard.

BACKGROUND OF THE INVENTION

The first detector in a television signal receiver converts radio-frequency (RF) signals in a selected one of the television broadcast chainels, which channels occupy various 6-MHz-wide portions of the electromagnetic wave frequency spectrum, to intermediate-frequency (IF) signals in one particular 6-MHz-wide portion of that spectrum. This conversion is typically carried out by superheterodyning the RF signals, which is to say mixing the RF signals with local oscillations from an oscillator oscillating at a frequency substantially higher than the frequencies in the television channel of highest frequency. The first detector is used to convert a selected RF signal to IF signal in order that up to 60 dB or more amplification can be done in that particular 6-MHz-wide portion of that spectrum using intermediate-frequency amplifiers with fixed, rather than variable, tuning. Amplification of the received signals is necessary to raise them to power levels required for further signal detection operations, such as video detection and sound detection in the case of analog TV signals, and such as symbol decoding in the case of digital TV signals. The first detector usually includes variable tuning elements in the form of pre-selection filter circuitry for the RF signals to select among the various 6-MHz-wide television channels and in the further form of elements for determining the frequency of the local oscillations used for super-heterodyning the RF signals. In TV receivers of more recent design the local oscillator signals are often generated using a frequency synthesizer in which the local oscillator signals are generated with frequency regulated in adjustable ratio with the fixed frequency of a standard oscillator.

Favored designs plural-conversion television receivers of the first detector upconverts the received television signals to a high-band intermediate-frequency band located above the highest ultra-high-frequency (UHF) channel used for television broadcasting, placing image frequencies well above 1 GHz so they do not fall within the tuning range of the receiver and are easily suppressed by filtering. The first detector response is selectively amplified by a fixed-tuned high-band intermediate-frequency amplifier having sufficient bandwidth to pass television signals and then in a second detection procedure the high-band IF amplifier response is downconverted to a low-band intermediate-frequency signal in a band located below the lowest very-high-frequency (VHF) channel currently used for television broadcasting and is selectively amplified by a fixed-tuned low-band intermediate-frequency amplifier having sufficient bandwidth to pass television signals. Baseband television signals are subsequently detected proceeding from the amplified low-band IF amplifier response. The band of frequencies the results of this first downconversion fall into will be referred to as "low-band" intermediate-frequencies in this specification, even if there is subsequent further downconversion to final intermediate-frequencies that are still closer to baseband.

Television signal receivers for receiving digital television (DTV) signals that have been described in the prior art use plural-conversion radio receivers wherein DTV signal in a selected one of the ultra-high-frequency (UHF) channels is first up-converted in frequency to generate a high-band intermediate-frequency signal in an intermediate-frequency band centered at 920 MHz. This high-band intermediate-frequency signal is amplified in a high-band intermediate-frequency amplifier using ceramic resonators for fixed tuning. The resulting amplified high-band intermediate-frequency signal is then down-converted in frequency by mixing it with 876 Mhz local oscillations, to generate a low-band intermediate-frequency signal in an intermediate-frequency band centered at 44 MHz. This low-band intermediate-frequency signal is then amplified in a low-band intermediate-frequency amplifier. The response of the low-band intermediate-frequency amplifier is then synchrodyned to baseband in DTV signal receivers developed by the Grand Alliance.

Radio receivers for receiving DTV signals, in which receivers the final intermediate-frequency signal is somewhere in the 1–8 MHz frequency range, are described by C. B. Patel and the inventor in U.S. Pat. No. 5,479,449 issued Dec. 26, 1995, entitled "DIGITAL VSB DETECTOR WITH BANDPASS PHASE TRACKER, AS FOR INCLUSION IN AN HDTV RECEIVER", and included herein by reference. The radio receivers specifically described in U.S. Pat. No. 5,479,449 are of triple-conversion type using a 920 MHz analog IF amplifier for first detector response, the first detector being an up-converter, and using a 44 MHz analog IF amplifier for second detector response, the second detector being a down-converter. A third detector is a further down-converter, generating a 1–8 MHz final IF signal as third detector response. This final IF signal is not amplified, but is digitized by an analog-to-digital converter for use in digital circuitry for synchrodyning to baseband. The resulting digital baseband signal is equalized and then data-sliced in a symbol decoder. The first intermediate-frequency amplifier in one of the DTV signal receivers described in U.S. Pat. No. 5,479,449 uses a surface-acoustic wave (SAW) filter for establishing the bandwidth of the 920 MHz IF amplifier.

For a period of years while DTV broadcasting is becoming established, it is planned that the broadcasting of analog TV signals will continue in the United States in accordance with the NTSC standard using the same UHF channels as DTV signals as well as other channels in the VHF and UHF bands. While analog and digital TV signals occupy the same television channels, the requirements of radio receivers for the two types of TV signal are not particularly compatible. Accordingly, there are good reasons for using separate radio receivers for analog TV signals and for digital TV signals in a system designed to receive both types of TV signal.

A reason for using separate radio receivers for analog TV signals and for digital TV signals that will be quite apparent to an electronics design engineer reviewing the systems standards for the two types of TV signals concerns the different radio receiver passbands for each type of TV signal. In an analog TV signal the video carrier is located at a frequency 1.25 MHz above the lower limit frequency of the TV channel, and the vestigial sideband exhibits no gain reduction vis-a-vis the full sideband until modulating frequencies exceed 750 kHz. Accordingly, the radio receiver for an analog TV signal customarily exhibits a linear roll-off of the overall intermediate-frequency response supplied to the video detector, which roll-off is down 6 dB at the video carrier frequency and provides for an overall flat baseband video response up to 4.2 MHz or so. In a DTV signal, the data is located at a frequency only 310 kHz above the lower limit frequency of the TV channel; and roll-off down 6 dB at the data carrier frequency is provided at the transmitter, rather than at the receiver. The overall intermediate-frequency response is essentially flat over a frequency band 6 MHz-wide between 1-dB-down limit frequencies in Grand Alliance receiver designs published by Zenith Radio Corporation.

A radio receiver for an analog TV signal customarily uses a trap filter for removing frequency-modulated sound carrier from the IF signal supplied the video detector. This is necessary to suppress a 920 kHz beat between the FM sound carrier and the amplitude-modulated chrominance subcarrier, which beat causes unwanted variation in the luminance component of the composite video signal recovered by the video detector. This luminance variation is obtrusively apparent when viewing images reproduced on a television viewscreen. Sound trap filters have not been used in prior-art DTV receiver designs, though co-channel interfering NTSC signals are a known problem during HDTV reception. The avoidance of trap filtering in the IF amplifiers of a DTV signal receiver makes it easier to maintain phase linearity throughout the IF passband.

U.S. patent application Ser. No. 08/746,520 filed Nov. 12, 1996 by A. L. R. Limberg and entitled "DIGITAL TELEVISION RECEIVER WITH ADAPTIVE FILTER CIRCUITRY FOR SUPPRESSING NTSC CO-CHANNEL INTERFERENCE" is incorporated herein by reference. That application teaches, in regard to a radio receiver for ATSC DTV signals, that a high-band intermediate-frequency amplifier that uses a SAW filter for tuning is advantageously modified to suppress the frequency-modulated audio carrier of NTSC co-channel interfering signal, so it does not affect the data-slicing used during symbol decoding. This allows improvement in comb filtering to suppress the remaining artifacts of the NTSC co-channel interfering signal so they have less effect on the data-slicing used during symbol decoding. A high-band intermediate-frequency amplifier that is so modified will not pass all components of an NTSC analog TV signal, of course, suggesting that separate radio receivers be used for analog TV signals and for digital TV signals.

A more subtle reason for using separate radio receivers for analog TV signals and for digital TV signals, of which one of ordinary skill in the art of design of just one of these types of radio receiver is probably unaware, is the difference in preferred designs of automatic gain control (AGC) for the radio receiver portions of analog TV signal receivers and of DTV signal receivers.

The power in an analog TV signal must be quite high in order that accompanying Johnson or galactic noise is low enough in amplitude as not to cause "snow" (luminance noise) in a black-and-white TV picture or "colored snow" (luminance plus chrominance noise) in a color TV picture. The effective radiated power from an analog TV transmitter is typically tens of kilowatts. The IF amplifiers in an analog TV signal receiver typically provide maximum gain of 60 to 90 dB, which can be reduced responsive to automatic gain control (AGC). Gain reduction of as much as 66 dB is required to handle the gamut of usable signal strengths. When receiving analog TV signals, this gain reduction is preferably obtained using forward AGC in at least the earlier IF amplifier stages. This avoids the problem of internally generated noise in the IF amplifier stages rising vis-a-vis Johnson noise to adversely affect overall noise figure for the radio receiver, which problem is encountered when using reverse AGC. The great concern with loss in noise figure when receiving analog TV signals arises because the human eye is quite sensitive to the presence of random noise accompanying the composite video signal from the video detector. The amplitude of the luminance signal component of the composite video signal directly controls the intensity of light emanating from or reflected from the television display device, and the amplitudes of the chrominance signal component of the composite video signal directly affect the hue and color saturation of that light.

In a DTV receiver the radio receiver portion thereof supplies plural-level symbol codes as baseband output signal, and the light emanating from or reflected from the television display device is not directly controlled by the amplitude of such baseband output signal. Small amounts of random noise are strongly rejected by quantizing effects in the data-slicing and trellis decoding associated with symbol decoding. Consequently, the overall noise figure for the radio receiver becomes of concern chiefly when distinguishing between the various levels of the symbol codes becomes a problem. In order best to facilitate distinguishing between the various levels of the symbol codes, linearity of the baseband output signal detected by the radio receiver becomes an important concern, and there is less concern for the overall noise figure for the radio receiver unless long-distance reception of DTV signals is sought for transmissions with power levels in the few hundreds of watts.

The AGC of the IF amplifiers in a DTV signal receiver must be such as to avoid non-linearity. Forward AGC tends to introduce non-linearity into the modulation of the IF signal. The resulting distortion is generally tolerable in analog TV signal reception, since larger amplitude modulation properly occurs primarily during synchronizing pulses, and since luminance signal varies in inverse logarithmic relation to scene brightness. Reverse AGC that does not introduce non-linearities into the modulation of the IF signal can be designed for a DTV signal receiver. This can be done using variable-resistance emitter degeneration in a common-emitter transistor amplifier, for example. Or, by way of further example, the collector current of a common-emitter transistor amplifier can be split using common-base transistor amplifiers connected at their emitter electrodes to form a variable-transconductance multiplier. The loss in noise figure with reduction of gain in such reverse AGC arrangements presents little problem as long as overall noise internally generated within the IF amplifier chain of the DTV receiver is smaller than the smallest transitions between digital modulation levels in the final IF amplifier output signal.

In plural-coversion DTV receivers of types similar to that described in U.S. Pat. No. 5,479,449, high-band IF signals supplied from the first detector are amplified and then filtered using a SAW filter. The large numbers of zeroes and poles needed for obtaining optimal filter responses are more easily implemented in UHF SAW filters than in VHF SAW filters. A high-band IF buffer amplifier preceding the SAW filter provides sufficient gain to overcome the subsequent insertion loss in the SAW filter and drives the SAW filter from an optimum source impedance for suppressing undesirable multiple reflections in the filter. Better to maintain that optimum source impedance, the buffer amplifier can be made to have fixed gain. The stages of the low-band intermediate frequency amplifier can be used to develop most of the intermediate-frequency gain, with automatic gain control being provided to at least some of these stages. A radio-frequency amplifier can be used before the first detector and provided with delayed automatic gain control to prevent very large input signals overloading the first mixer.

The cost of a first detector is substantial enough that it is undesirable to use separate first detectors for analog TV signals and for digital TV signals in radio receivers designed to receive both types of signal, whether those radio receivers are included in a TV set complete with viewscreen or in a digital recording apparatus. such as one using magnetic tape as a recording medium. The use of a single first detector for both analog TV signals and digital TV signals is also desirable in that it allows more compact radio receiver design and at the same time avoids any problems of unwanted radiation from the output of one of separate respective first detectors for analog TV signals and for digital TV signals to the other first detector. Where a high-band IF amplifier has fixed gain and automatic gain control of intermediate frequency amplifier stages is deferred until the low-band IF amplifier following a second mixer. it is also feasible to use the same high-band IF amplifier for the amplitude-modulated NTSC video carrier of an analog television signal as for digital television signal

SUMMARY OF THE INVENTION

A radio receiver for receiving DTV signals, in accordance with the Advanced Television Systems Committee (ATSC) standard, or analog TV, in accordance with the National Television System Committee (NTSC) standard, embodies a principal aspect of the invention by using a single first detector for both types of signal and by following the first detector with an intermediate-frequency amplifier providing amplification both for digital television signal and for the amplitude-modulated NTSC video carrier of an analog television signal.

In preferred embodiments of the invention the shared intermediate-frequency amplifier is a high-band intermediate-frequency amplifier having fixed gain and having its bandwidth determined using a surface-acoustic-wave filter with flat-amplitude midband response, steep-slope skirts, and linear phase throughout its passband. A second mixer, which downconverts the high-band intermediate-frequency amplifier response to a low-band intermediate-frequency signal, is followed by a respective low-band intermediate-frequency amplifier for digital television signal and a respective low-band intermediate-frequency amplifier for the amplitude-modulated NTSC video carrier of an analog television signal. The respective low-band intermediate-frequency amplifier for digital television signal employs automatic gain control of reverse type and avoids automatic gain control of forward type in order to maintain linearity of gain. The respective low-band intermediate-frequency amplifier for the amplitude-modulated NTSC video carrier employs automatic gain control of forward type in order to keep noise figure lower.

BRIEF DESCRIPTION OF THE DRAWING

Each of FIGS. 1–8 is a block schematic diagram of portions of a respective receiver for analog TV and digital TV signals, which receiver portions each embody the invention.

DETAILED DESCRIPTION

Figure 1:
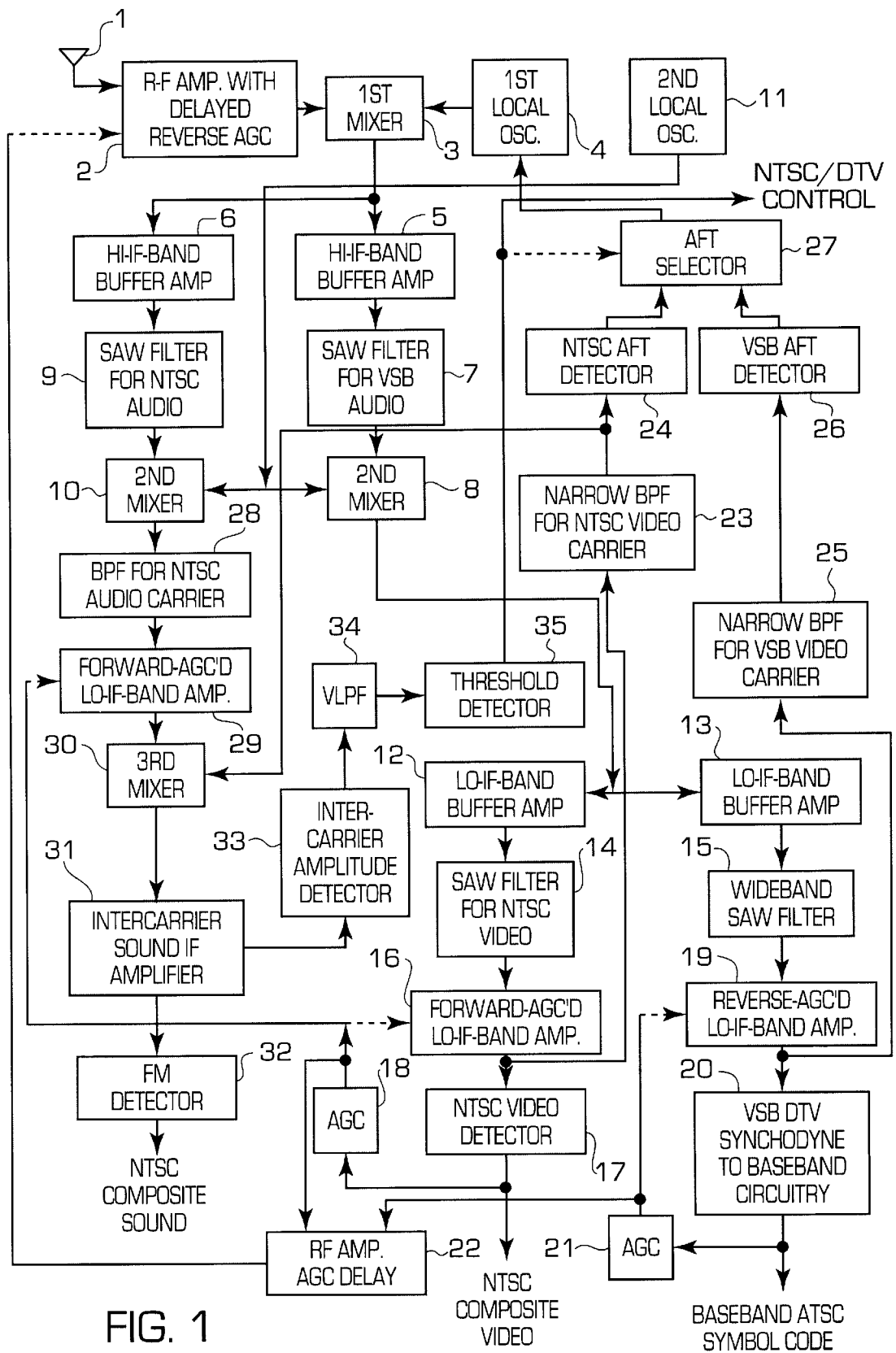

FIG. 1 shows the radio receiver portions of a television receiver capable of receiving either analog TV signals or digital TV signals. An antenna 1 is a representative source of television signals in the very high frequency (VHF) and ultra high frequency (UHF) bands and is amplified by a tuned radio-frequency amplifier 2 with reverse automatic gain control (AGC). The RF amplifier 2 receives delayed AGC signals that reduce its gain when the amplified RF signals it supplies to first mixer 3 are larger than desired, tending to operate the first mixer 3 outside the range it provides linear multiplicative mixing. The first mixer is preferably of a doubly-balanced linear-multiplication type. The first mixer 3 heterodynes the amplified RF signals with oscillations from a first local oscillator 4 to implement a first detector that upconverts the amplified RE signals to a frequency range above the uppermost ultra-high-frequency television broadcast channel. The frequency of the oscillations supplied from the first local oscillator 4 can be adjusted over a limited range responsive to an automatic fine tuning (AFT) signal. The first local oscillator 4 can be of frequency synthesizer type. The image frequencies from the mixer 3 are almost 2 GHz and are suppressed by a broadband coupling network (not specifically shown in FIG. 1) that applies the mixer results to high-intermediate-frequency-band buffer amplifiers 5 and 6. The image frequencies from the mixer 3 are above the frequencies passed by broadband preselection filtering at the input of the tuned radio-frequency amplifier 2, so these image frequencies do not give rise to undesirable regenerative effects.

The buffer amplifier 5 supplies high-band IF signal to a surface-acoustic-wave filter 7 having a substantially linear-phase, flat-amplitude response that has −1 dB to −1 dB bandwidth of 5.7 MHz and provides sound trapping for frequency-modulated NTSC audio carrier. The buffer amplifier 5 provides fixed gain to make up the 10–12 dB insertion loss of the SAW filter 7 and drives the SAW filter 7 from a fixed source impedance chosen to avoid unwanted reflections. The response of the SAW filter 7 to the high-band IF signal as amplified by the buffer amplifier 5 is supplied to a respective second mixer 8 as a first amplified high-band intermediate frequency signal. The second mixer 8 downconverts the VSB DTV high-band IF signal or the amplitude-modulated NTSC video carrier high-band IF signal, to generate a corresponding low-band IF signal.

The buffer amplifier 6 supplies high-band IF signal to a surface-acoustic-wave filter 9 that selects frequency-modulated NTSC audio carrier for application to a respective second mixer 10 as a second amplified high-band intermediate frequency signal. The second mixer 10 downconverts the FM audio carrier, to generate a corresponding low-band IF signal. The second mixers 8 and 10 preferably use the same second local oscillator 11 to implement their respective second detection procedures, as shown in FIG. 1. The respective conversion results of these second detection procedures preferably repose below the lowest very-high-frequency (VHF) channel for television broadcasting. This facilitates broadband preselection filtering at the input of the tuned radio-frequency amplifier 2 rejecting the low-band-IF signals, so these signals do not give rise to undesirable regenerative effects. At the same time, within the foregoing constraint, it is generally desirable not to make the low-band-IF signals too low in frequency if the downconversion results from the mixers 8 and 10 are to be filtered using SAW filters. The downconversion results from the mixer 10 are preferably at a frequency somewhat below 44 MHz, so second harmonics thereof will not fall into the FM broadcast frequency spectrum.

The second mixer 8 supplies a response containing a VSB DTV low-band IF signal or an amplitude-modulated NTSC video carrier low-band IF signal, which is applied to the input ports of buffer amplifiers 12 and 13. This application is preferably via a broadband tuned coupling network (not explicitly shown in FIG. 1). The buffer amplifier 12 drives a surface-acoustic-wave filter 14 from a source impedance that minimizes multiple reflections in the filter and provides gain for overcoming the insertion loss of the filter 14. The SAW filter 14 is a match filter for NTSC video transmissions, which has a shaped response to amplitude-modulated NTSC video carrier low-band IF signal that de-emphasizes the frequencies near the video carrier having a double-sideband character vis-a-vis the frequencies remote from the video carrier having a single-sideband character. The buffer amplifier 13 drives a surface-acoustic-wave filter 15 from a source impedance that minimizes multiple reflections in the filter and provides gain for overcoming the insertion loss of the filter 15. The SAW filter 15 is either a match filter for ATSC DVT transmissions or is a wideband bandpass filter that passes VSB DTV low-band IF signal without substantial alteration of relative amplitude or phase of its component frequencies.

(In a variant of the structure shown in FIG. 1, the second mixer 8 is replaced by two second mixers respectively supplying the buffer amplifiers 12 and 13 with input signals. In a further variant, the buffer amplifiers 12 and 13 are dispensed with; and the two second mixers used instead of the mixer 8 drive the SAW filters 14 and 15 directly, with the replacement second mixers preferably providing conversion gains that overcome the insertion losses of the SAW filters 14 and 15.)

The response of the SAW filter 14 is amplified in a wideband intermediate-frequency amplifier 16 that has forward AGC in one or more of its stages. The resulting amplified low-band signal from the IF amplifier 16 is supplied to an NTSC video detector 17, which will generate a baseband NTSC composite video signal responsive to the IF amplifier 16 supplying an amplified amplitude-modulated NTSC video carrier as the amplified low-band IF signal. Automatic gain-control circuitry 18 detects the tips of synchronizing pulses in the baseband NTSC composite video signal to generate the AGC signal used for controlling the gains of stages in the IF amplifier 16. The design of the AGC circuitry 18 and the intermediate-frequency amplifier 16 follows past practices used in the design of analog TV receivers.

At least to an extent this is true also of the design of the video detector 17. The video detector 17 may be a simple envelope detector, which is simple, dependable in its operation, low in cost and long familiar in the art. Better linearity can be obtained using a video detector 17 of synchrodyne type comprising a respective third local oscillator furnishing third local oscillations of a controlled frequency equal to video carrier frequency, an in-phase synchronous detector for synchronously detecting composite video signal from AM video carrier in response to in-phase third local oscillations, and a quadrature-phase synchronous detector for developing automatic frequency and phase control (AFPC) signals for the third local oscillator by synchronously detecting AM video carrier in response to quadrature-phase third local oscillations. The design of a video detector 17 of synchrodyne type departs somewhat from previous practice if the low-band IF signal is located lower in frequency than the 41–47 MHz band or if the low-band IF signal does not exhibit spectrum reversal as compared to the RF analog TV signal. At the beginning of the era of transition from analog TV to DTV broadcasting, the number of analog TV Designs are possible which use a video detector of envelope type to supply composite video signal to an AGC detector in the AGC circuitry and which use a video detector of synchrodyne type for supplying composite video from which luminance and chrominance signals are extracted.

The response of the SAW filter 15 is amplified in a wideband intermediate-frequency amplifier 19 that has reverse AGC. The resulting amplified low-band signal from the IF amplifier 19 is synchrodyned to baseband by synchrodyning circuitry 20. U.S. Pat. No. 5,479,449 describes the synchrodyning circuitry 20 as including circuitry for converting the amplified second IF signal to a final IF signal somewhere in a 1 to 8 MHz band, an analog-to-digital converter for digitizing the final IF signal, and digital circuitry for completing the synchrodyne to baseband in the digital regime. Alternatively, as in the receivers used by the Grand Alliance during HDTV field testing, the synchrodyning circuitry 20 can be operative in the analog regime, with the analog baseband signal being digitized by an analog-to-digital converter for application to equalizer circuitry. The equalizer circuitry is then cascaded with a phase tracker operative at baseband.

The in-phase baseband signal from the synchrodyning circuitry 20 is supplied to an automatic gain-control circuitry 21 which generates the AGC signal used for controlling the gains of stages in the IF amplifier 19. The automatic gain-control circuitry 21 can take any of a number of known forms. In the early Grand Alliance receivers the AGC circuitry for DTV signals used a matched filter responsive to data segment code groups, and of the response of this matched filter was peak detected to develop a basic AGC signal which was then use to develop delayed AGC for the IF amplifier stages. An AGC that responds to average symbol value can be used, as described by Citta et alii in U.S. Pat. No. 5,565,932 entitled "AGC SYSTEM WITH PILOT USING DIGITAL DATA REFERENCE". The form for AGC circuitry 21 preferred by the inventor is one that detects the direct component of the baseband signal generated by synchrodyning the pilot carrier to baseband during the reception of DTV signals and that during the reception of analog TV signals falls back on envelope detection of the IF amplifier 19 response to develop AGC. This prevents the IF amplifier 19 from operating with excessive gain during the reception of analog TV signals, so that video carrier signals can be extracted from the IF amplifier 19 response.

When very strong RF signals are received, it is desirable to reduce the gain of the RF amplifier 2, to prevent overload of the first mixer 3. Circuitry 22 responds to AGC signal supplied from either the AGC circuitry 18 and the AGC circuitry 22 to apply delayed AGC signal to the RF amplifier 2 to forestall overload of the first mixer 3. If the receiver is equipped also to receive QAM DTV signals using further intermediate frequency amplification circuitry, the circuitry 22 also responds to AGC signal for this further IF amplification circuitry to apply delayed AGC signal to the RF amplifier 2 to forestall overload of the first mixer 3. Since overload of the first mixer 3 occurs only on very strong signal, the RF amplifier 2 can employ reverse AGC without the resulting loss of noise figure being too great a problem. Employing reverse AGC in the RF amplifier 2 is preferable for preserving the linearity of gain desired in a digital receiver. The adjustably tuned bandpass filters associated with the RF amplifier 2 are generally broader in digital receivers than in analog TV receivers. Since flat response is desired from these filters for a selected TV channel, their response normally extend over adjoining channels. The problem of the first mixer 3 overloading on a strong adjacent channel when attempting to receive a relatively weak channel is expected to be more serious in DTV receivers than in analog TV receivers. Since in urban areas more TV receivers receive signals from sources other than over-the-air than was the case in the past, and since in remote suburban and rural areas directional antennas can often be used to reduce the strength of adjacent channels, the problem of first mixer overloading on a strong adjacent channel is more economic to leave unsolved.

It is preferable that the SAW filter 7 have a substantially linear-phase, flat-amplitude response that suppresses the frequency-modulated NTSC sound carrier and that accordingly has a −1 dB to −1 dB bandwidth of only 5.7 MHz. This reduces the effects of NTSC co-channel interference on the data-slicing used during symbol decoding. With the skirts of the SAW filter 7 response being so critically located within the frequency spectrum, automatic fine tuning (AFT) of the first local oscillator 4 becomes practically a necessity. The second local oscillator 11 is crystal stabilized, so that the amplified low-band IF signal from the low-band IF amplifier 16 can be used for AFT during the reception of analog TV signals, and so that the amplified low-band IF signal from the low-band IF amplifier 19 can be used for AFT during the reception of DTV signals.

When an analog TV signal is received, a narrow bandpass filter 23 selects to an AFT detector 24 low-IF-band video carrier from the amplified low-band IF signal supplied from the IF amplifier 16. The AFT detector 24 is similar in its general construction to those previously used in analog TV signal receivers, typically comprising a limiter amplifier for the bandpass filter 23 response it receives as input signal, a phase shifter for shifting the video carrier 90° when it is at prescribed frequency for the low-IF-band video carrier, a multiplier for multiplying the differentially phase-shifted video carrier signals together, and a lowpass filter for extracting the AFT signal from the resulting product.

When a DTV signal is received, a narrow bandpass filter 25 selects to an AFT detector 26 low-IF-band pilot carrier from the amplified low-band IF signal supplied from the IF amplifier 19. The AFT detector 26 is similar in its general construction to those previously used in analog TV signal receivers, typically comprising a limiter amplifier for the bandpass filter 25 response it receives as input signal, a phase shifter for shifting the pilot carrier 90° when it is at prescribed frequency for the low-IF-band pilot carrier, a multiplier for multiplying the differentially phase-shifted pilot carrier signals together, and a lowpass filter for extracting the AFT signal from the resulting product.

An AFT selector 27 selects the AFT signal from the AFT detector 24 for application to the first local oscillator 4 when an NTSC/DTV CONTROL signal indicates that an analog TV signal is being received. The AFT selector 27 selects the AFT signal from the AFT detector 26 for application to the first local oscillator 4 when the NTSC/DTV control signal does not indicate that an analog TV signal is being received. One way of generating the NTSC/DTV CONTROL signal is to detect whether or not the NTSC audio carrier is present. The problem with doing this is that broadcasters may continue to use the NTSC audio carrier with DTV broadcasting. A better way of generating the NTSC/DTV CONTROL signal is to detect whether or not both the NTSC audio carrier and the NTSC video carrier are present. This can be done by detecting whether or not intercarrier sound can be generated, as will be described hereafter.

The second mixer 10 supplies a frequency-modulated NTSC audio carrier low-band IF signal when an analog TV signal is received. A bandpass filter 28 selects this FM carrier as input signal for a wideband intermediate-frequency amplifier 29. This bandpass filter is a double-tuned transformer, for example, or comprises a SAW filter, by way of alternative example. The IF amplifier 29 is similar to the wideband intermediate-frequency amplifier 16 insofar as its gain being controlled in response to AGC signal supplied from the circuitry 18 is concerned. The output port of the IF amplifier 29 is connected to a first input port of a third (IF) mixer 30, and the AGC of the IF amplifier 29 is such as to avoid overloading of the third mixer 30 on stronger signal. The IF amplifier 29 supplies the third mixer 30 with amplified low-IF-band FM sound carrier when NTSC analog TV signals are received. The third mixer 30 receives at second input port the response from the narrow-band bandpass filter 23. When NTSC analog TV signals are received, the filter 23 supplies video carrier in response to the amplified low-band IF signal from the IF amplifier 19. When NTSC analog TV signals are being received, the output signal from the mixer 30 is a frequency-modulated 4.5 MHz intercarrier; and, when NTSC analog TV signals are not being received, the output signal from the mixer 30 is noise. The output signal from the mixer 30 is amplified in a high-gain intercarrier sound IF amplifier designed to limit only when frequency-modulated 4.5 MHz intercarrier is present in that signal. The response of the intercarrier sound IF amplifier 31 is supplied to a frequency discriminator or frequency-modulation detector 32, which reproduces NTSC composite sound signal. This NTSC composite sound signal is a baseband signal comprising a main channel component that is a left-plus-right signal during stereophonic sound transmissions. During stereophonic sound transmissions the NTSC composite sound signal comprises a stereophonic subcarrier amplitude modulated by a left-minus-right signal. The NTSC composite sound signal may also comprise other subcarriers modulated by subsidiary audio program (SAP) signal(s).

The fact that frequency-modulated 4.5 MHz intercarrier signal is present in output signal from the mixer 30 only when NTSC analog TV signals are being received either intentionally or because of strong co-channel interference during DTV signal reception is exploited in the FIG. 1 circuitry to develop the NTSC/DTV CONTROL signal. Amplified mixer 30 output signal is supplied from the intercarrier sound IF amplifier 31 to an intercarrier amplitude detector 33, which detects the average amplitude of the 4.5 MHz intercarrier. The intercarrier amplitude detector 33 can be a simple envelope detector with a time constant of several NTSC scan lines, for example. The baseband response of the amplitude detector 33 is supplied to a lowpass filter 34 with a very low cut-off frequency, a few hertz at most, and the smoothed response is supplied from the filter 34 to a threshold detector 35, which generates the NTSC/DTV CONTROL signal as its output signal. The threshold detector 35 provides an indication of probable NTSC signal reception, if the detected intercarrier signal exceeds a threshold value in amplitude, and otherwise provides an indication of probable DTV signal reception free from appreciable co-channel interference.

Figure 2:
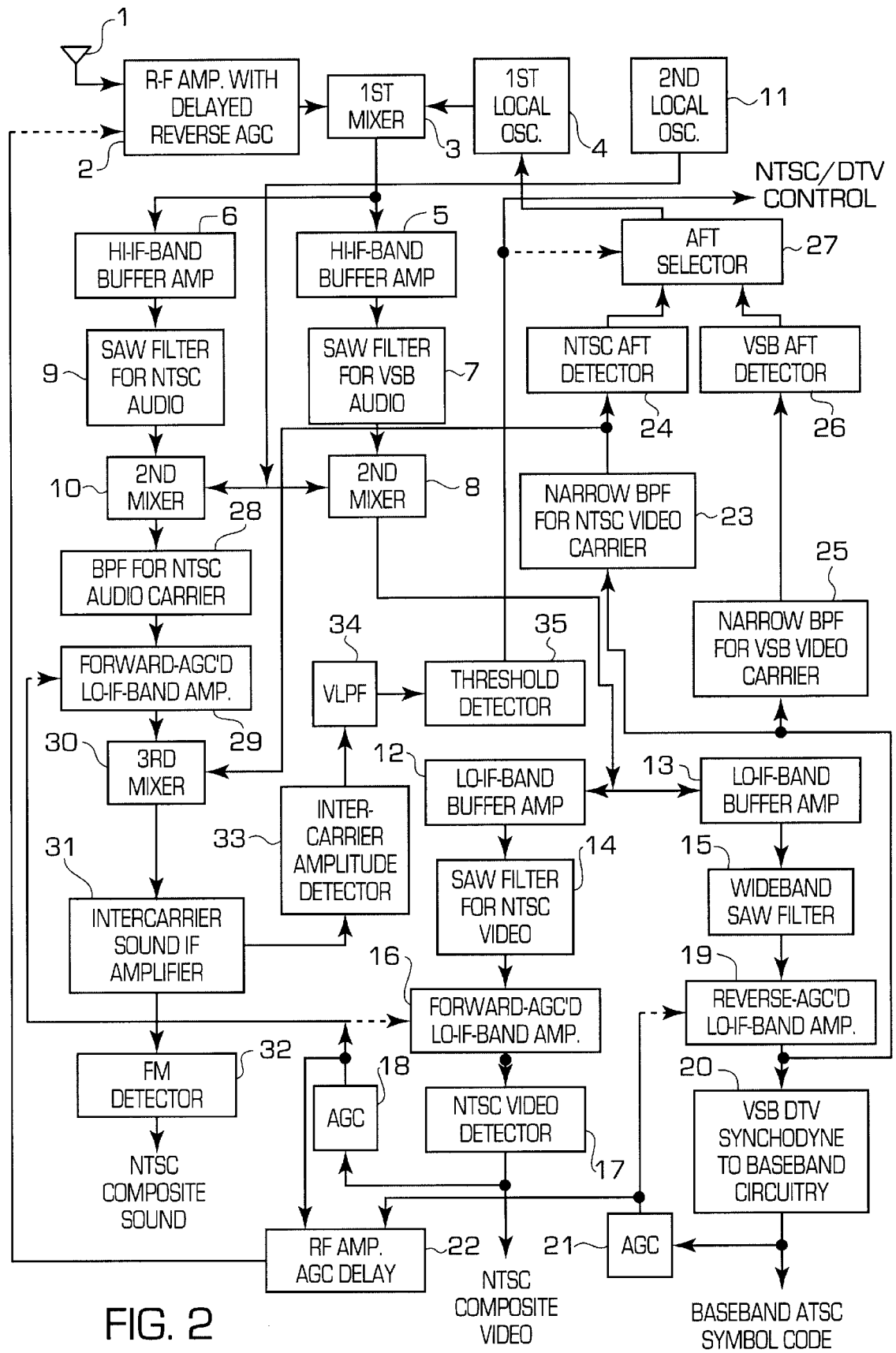

FIG. 2 shows radio receiver portions of a television receiver capable of receiving either analog TV signals or digital TV signals, which radio receiver portions differ from those shown in FIG. 1 in regard to how AFT signals are developed. The narrow bandpass filter 23 is connected to select low-IF-band video carrier from the amplified low-band IF signal supplied by the IF amplifier 19, rather than from the amplified low-band IF signal supplied by the IF amplifier 16. The fact that the responses of the SAW filters 7 and 15 are both amplitude-flat and phase-linear to the edge of the band at which the pilot carrier of the DTV signal and the video carrier of an NTSC analog TV signal are located makes the amplified low-band IF signal from the IF amplifier 19 a suitable signal source for the generation of AFT signals no matter whether the TV signal being currently received is a DTV signal or is an analog TV signal.

During the reception of analog TV signal, the synchrodyne circuitry 20 may not supply the AGC circuitry 21 with baseband signal causing the generation of AGC signal to control the gain of the IF amplifier 19. This is the case where AGC is developed from the direct component of DTV signal synchrodyned to baseband (that is, the synchronously detected pilot signal) without providing for alternate generation of AGC signal by envelope detection of the amplified low-band IF signal from the IF amplifier 19. Preferably, provision is made for alternate generation of AGC signal to avoid AGC lock-out when strong DTV signals are initially received and AGC generated by synchrodyne has not yet had time to cut back receiver gain. However, if the IF amplifier 19 is driven into limiting, the video carrier generally is preserved in the IF amplifier 19 response.

Figure 3:
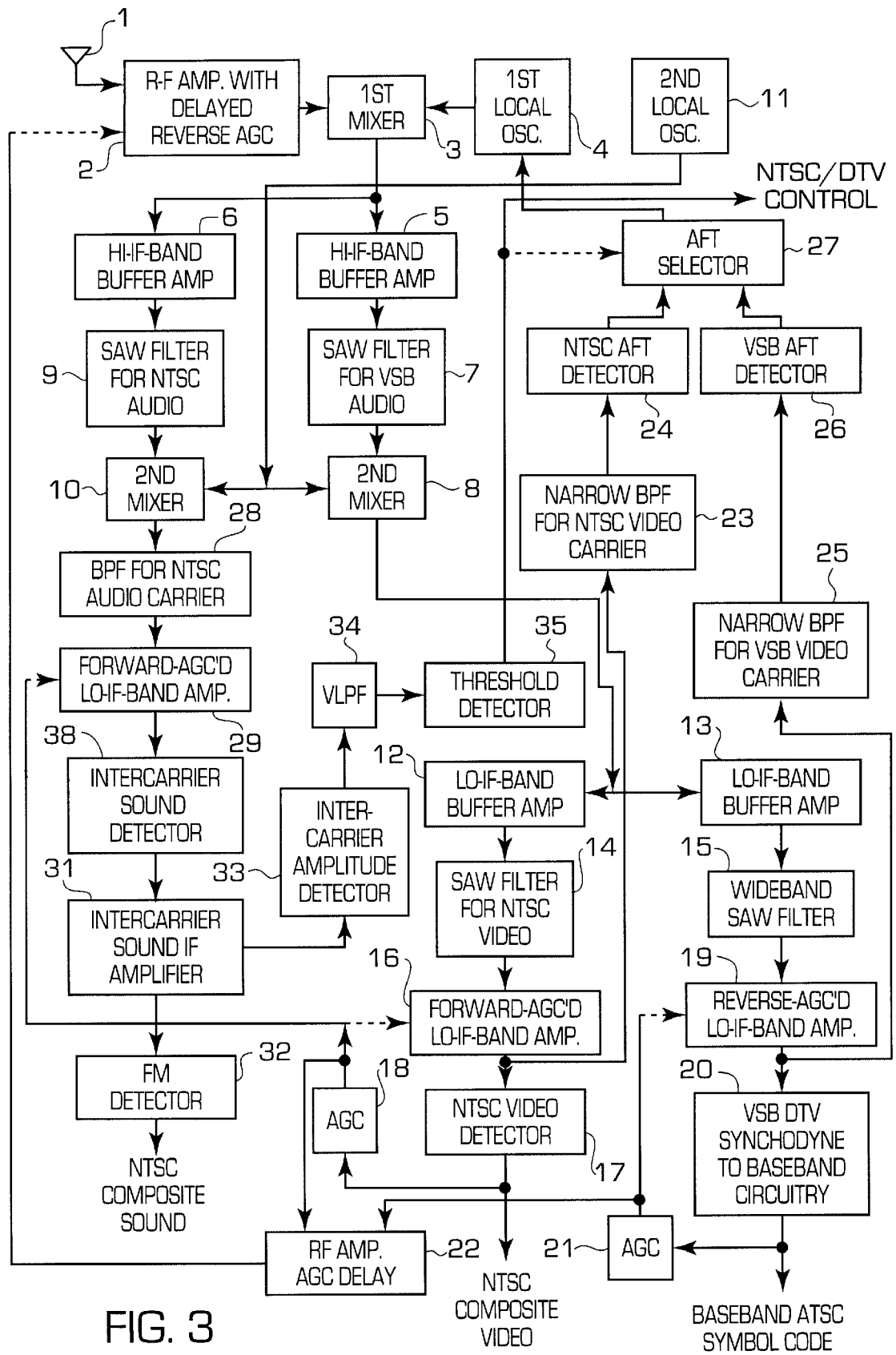

FIG. 3 shows portions of a radio receiver for receiving analog TV and digital TV signals, which radio receiver portions differ from those in FIG. 1 in the way that intercarrier sound is generated. The narrowband SAW filter 9 for high-IF-band NTSC FM audio carrier is replaced by a SAW filter 36 having a double-hump response with peaks at the frequencies NTSC audio carrier and NTSC video carrier are translated to in the high-band intermediate frequencies. There is about a 10 dB dip in response between the peak frequencies to suppress NTSC chrominance signal as translated to high-band intermediate frequencies. The narrow bandpass filter 28 is replaced by a bandpass filter with a bandwidth greater than 4.5 MHz, shown in FIG. 3 as being a surface-acoustic-wave filter 37. The third mixer 30 is replaced by an intercarrier sound detector 38, which can be a simple envelope detector using a rectifier or can be a square-law detector. The intercarrier sound detector 38 supplies intercarrier sound with frequency-modulated 4.5 MHz carrier for amplification by the intercarrier sound IF amplifier 31.

Figure 4:
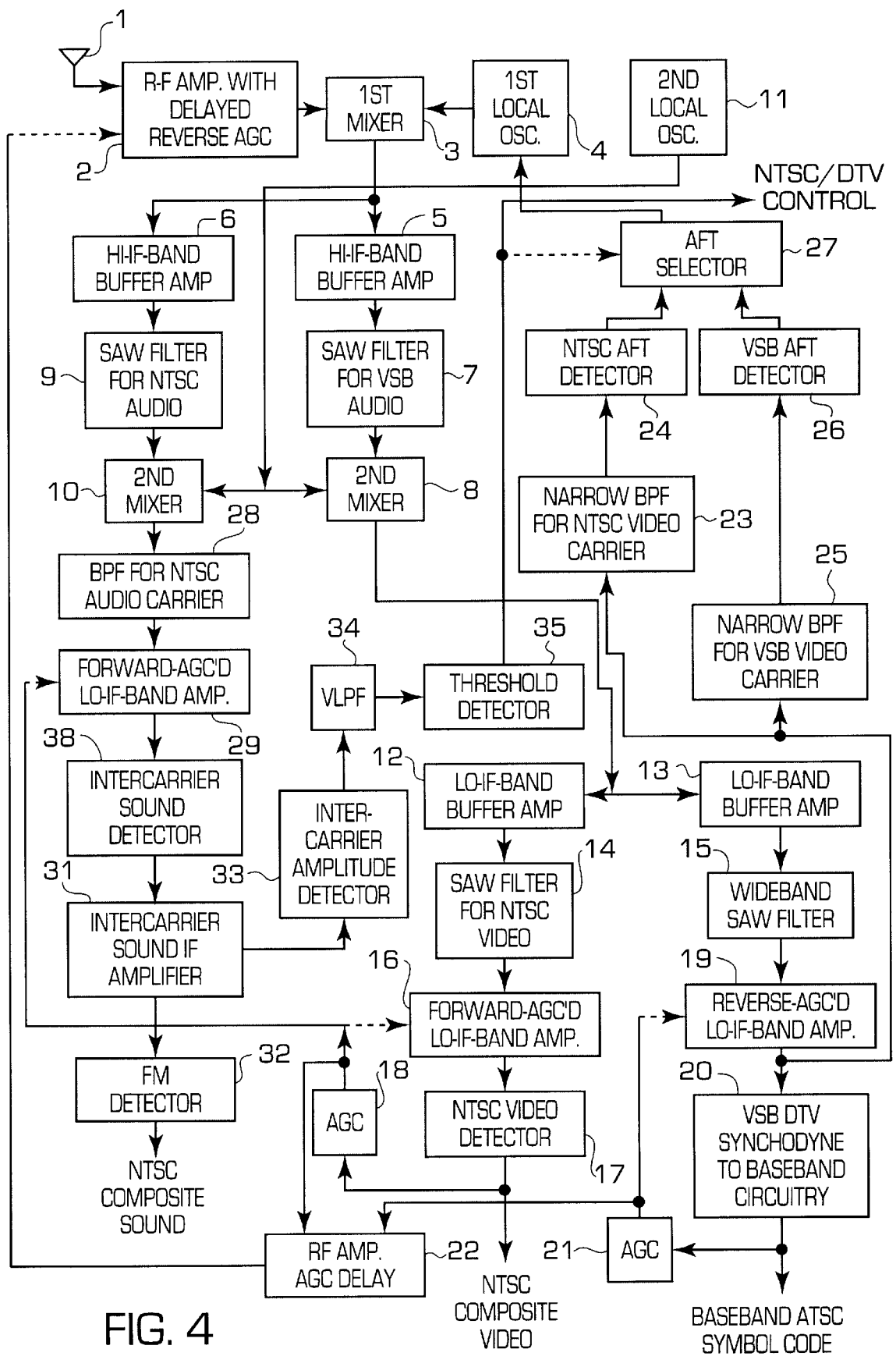

FIG. 4 shows radio receiver portions of a television receiver capable of receiving either analog TV signals or digital TV signals, which radio receiver portions differ from those shown in FIG. 3 in regard to how AFT signals are developed. The narrow bandpass filter 23 is connected to select low-IF-band video carrier from the amplified low-band IF signal supplied by the IF amplifier 19, rather than from the amplified low-band IF signal supplied by the IF amplifier 16.

Figure 5:
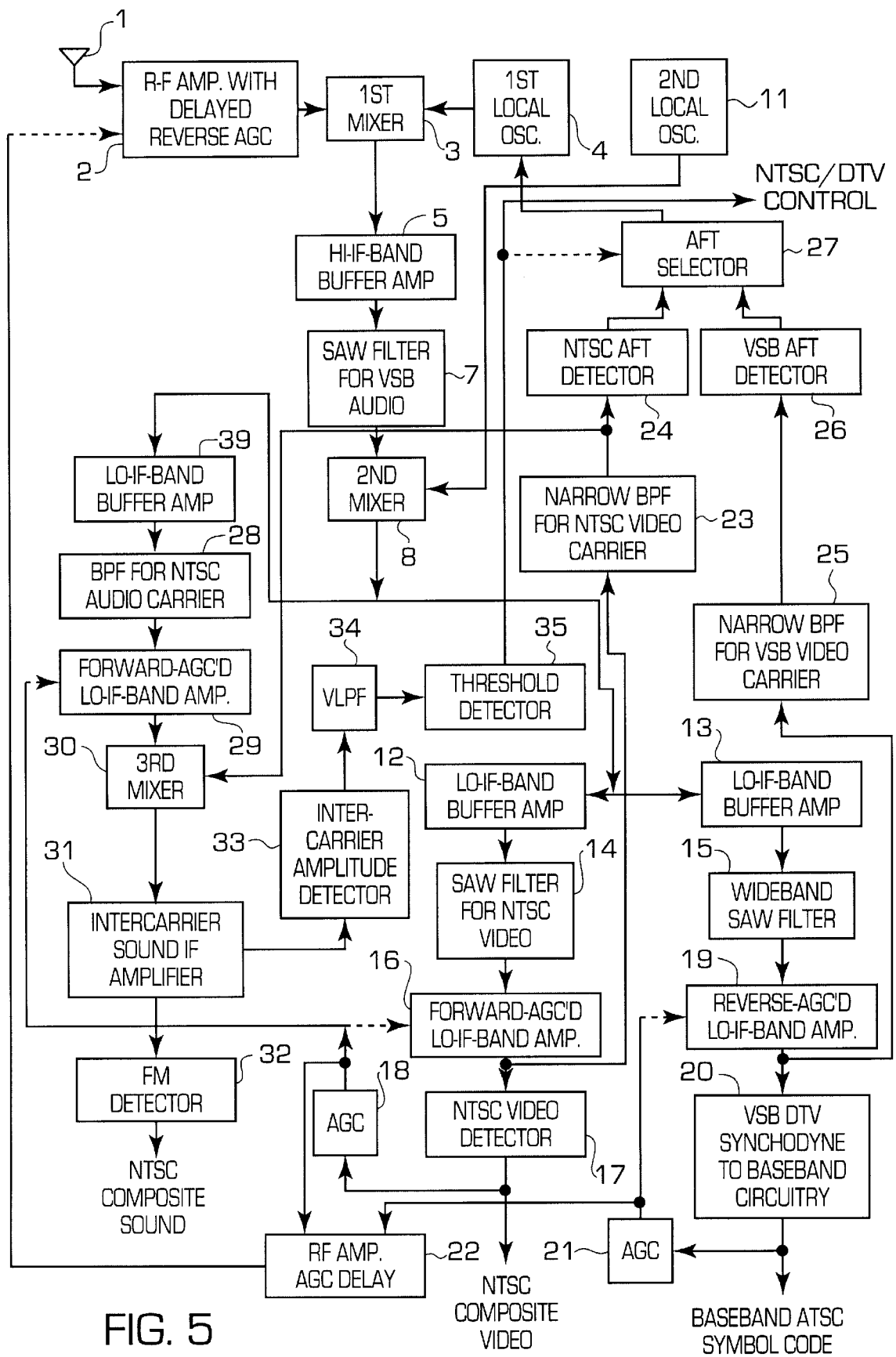

FIG. 5 shows portions of a radio receiver for receiving analog TV and digital TV signals, which radio receiver portions differ from those of FIG. 1 in that the filter for implementing quasi-parallel sound amplification is located in a low-band IF amplifier, with the second mixer 10 and the high-band IF amplifier supplying it with selectively amplified high-band IF signal being dispensed with. The high-band IF amplifier supplying the second mixer 8 with selectively amplified high-band IF signal is modified to replace the SAW filter 7 with another surface-acoustic-wave filter 07 that has a full 6 MHz bandwidth. The SAW filter 14 for NTSC video signal is replaced by a surface-acoustic-wave filter 014 that has a sound trap for the frequency-modulated NTSC audio carrier, as well as providing a shaped response to amplitude-modulated NTSC video carrier low-band IF signal that de-emphasizes the frequencies near the video carrier having a double-sideband character vis-a-vis the frequencies remote from the video carrier having a single-sideband character. The low-band IF signal from the second mixer 8 is supplied to a further low-IF-band buffer amplifier 39 as well as the low-IF-band buffer amplifiers 12 and 13. The low-IF-band buffer amplifier 39 drives the bandpass filter 26 for selecting the frequency-modulated NTSC audio carrier.

Figure 6:
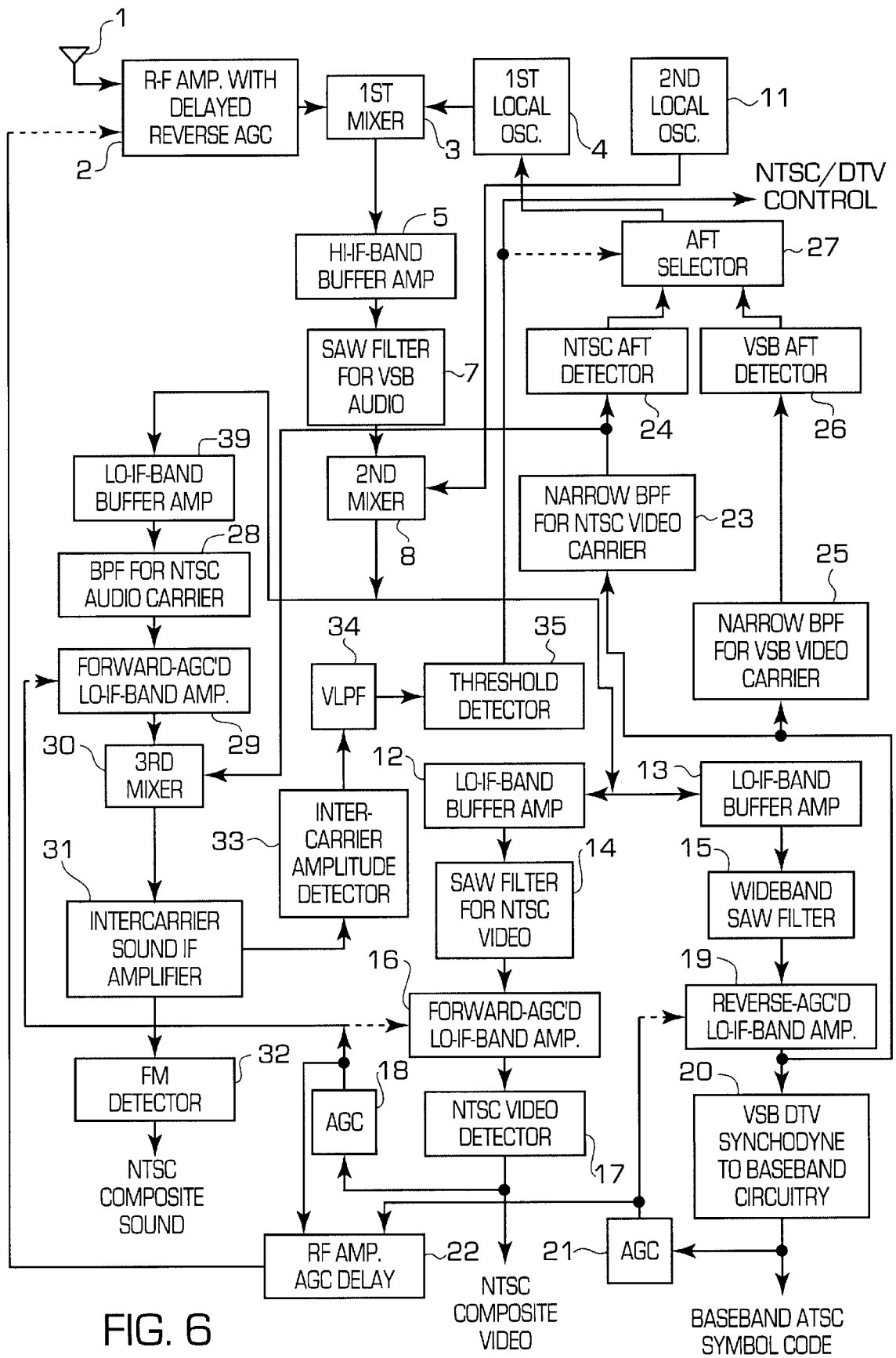

FIG. 6 shows radio receiver portions of a television receiver capable of receiving either analog TV signals or digital TV signals, which radio receiver portions differ from those shown in FIG. 5 in regard to how AFT signals are developed. The narrow bandpass filter 23 is connected to select low-IF-band video carrier from the amplified low-band IF signal supplied by the IF amplifier 19, rather than from the amplified low-band IF signal supplied by the IF amplifier 16.

Figure 7:
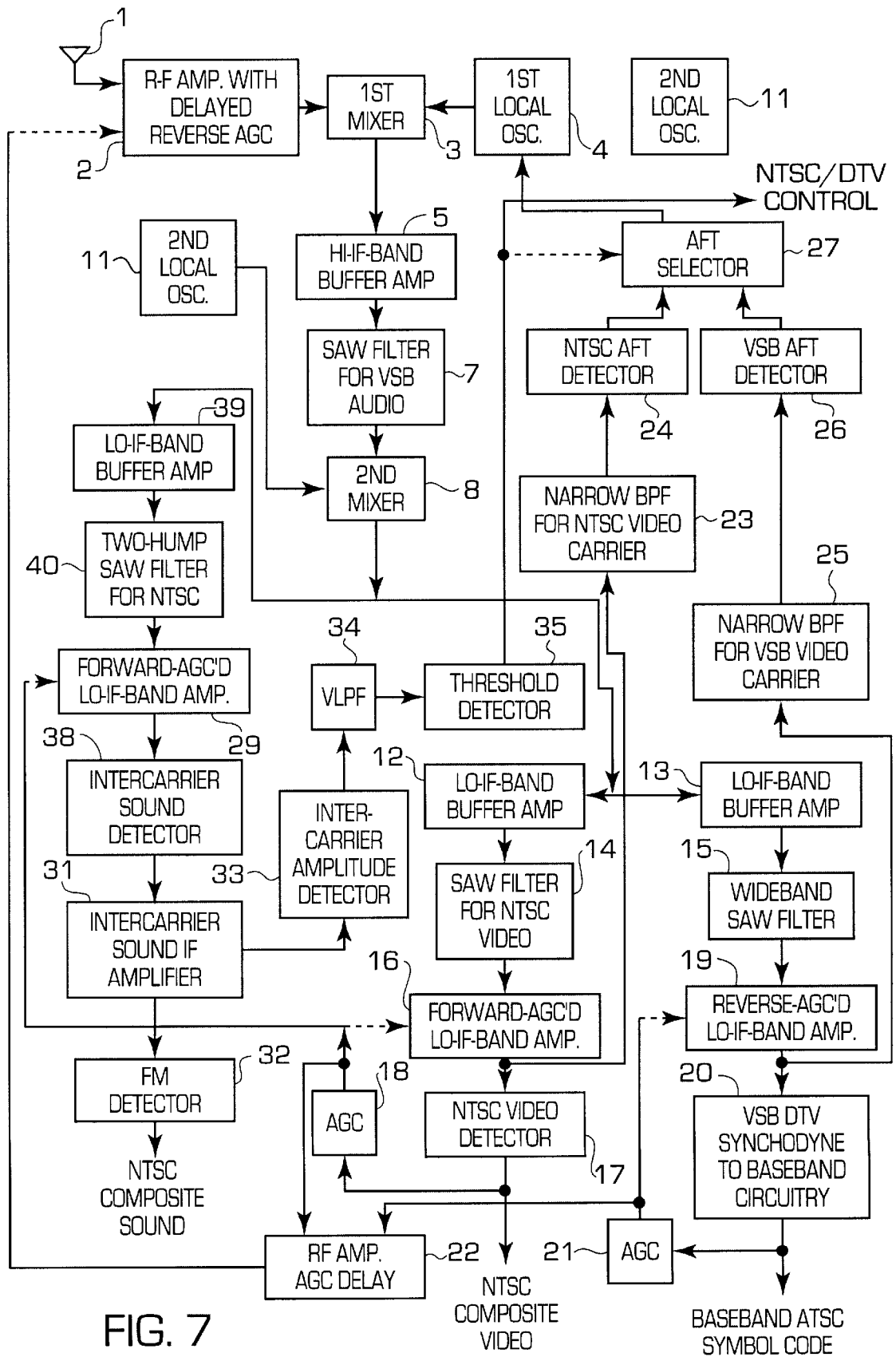

FIG. 7 shows portions of a radio receiver for receiving analog TV and digital TV signals, which radio receiver portions differ from those of FIG. 3 in that the filter for implementing quasi-parallel sound amplification is located in a low-band IF amplifier, with the second mixer 10 and the high-band IF amplifier supplying it with selectively amplified high-band IF signal being dispensed with. The high-band IF amplifier supplying the second mixer 8 with selectively amplified high-band IF signal is modified to replace the SAW filter 7 with another surface-acoustic-wave filter 07 that has a full 6 MHz bandwidth. The SAW filter 14 for NTSC video signal is replaced by a surface-acoustic-wave filter 014 that has a sound trap for the frequency-modulated NTSC audio carrier, as well as providing a shaped response to amplitude-modulated NTSC video carrier low-band IF signal that de-emphasizes the frequencies near the video carrier having a double-sideband character vis-a-vis the frequencies remote from the video carrier having a single-sideband character. The low-band IF signal from the second mixer 8 is supplied to a further low-IF-band buffer amplifier 39 as well as the low-IF-band buffer amplifiers 12 and 13. The low-IF-band buffer amplifier 39 drives a surface-acoustic-wave filter 40 from a source impedance that minimizes multiple reflections in the filter and provides gain for overcoming the insertion loss of the filter 40. The SAW filter 40 has a double-hump response with peaks at the NTSC video and audio carriers as translated to low-band intermediate frequencies, to provide for quasi-parallel sound recovery. The response of the SAW filter 40 is supplied as input signal to the low-IF-band amplifier 29.

Figure 8:
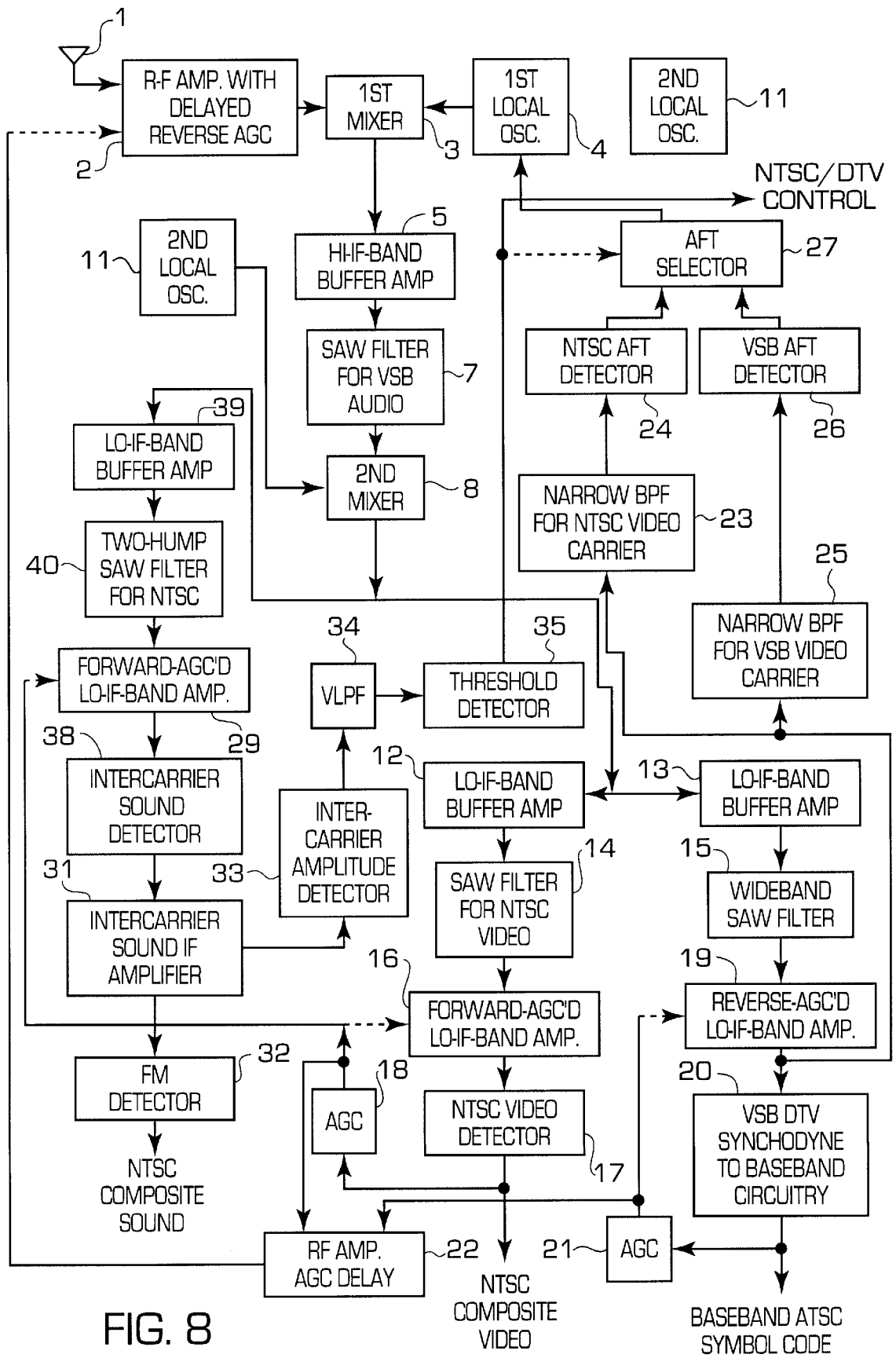

FIG. 8 shows radio receiver portions of a television receiver capable of receiving either analog TV signals or digital TV signals, which radio receiver portions differ from those shown in FIG. 7 in regard to how AFT signals are developed. The narrow bandpass filter 23 is connected to select low-IF-band video carrier from the amplified low-band IF signal supplied by the IF amplifier 19, rather than from the amplified low-band IF signal supplied by the IF amplifier 16.

Figure 9:
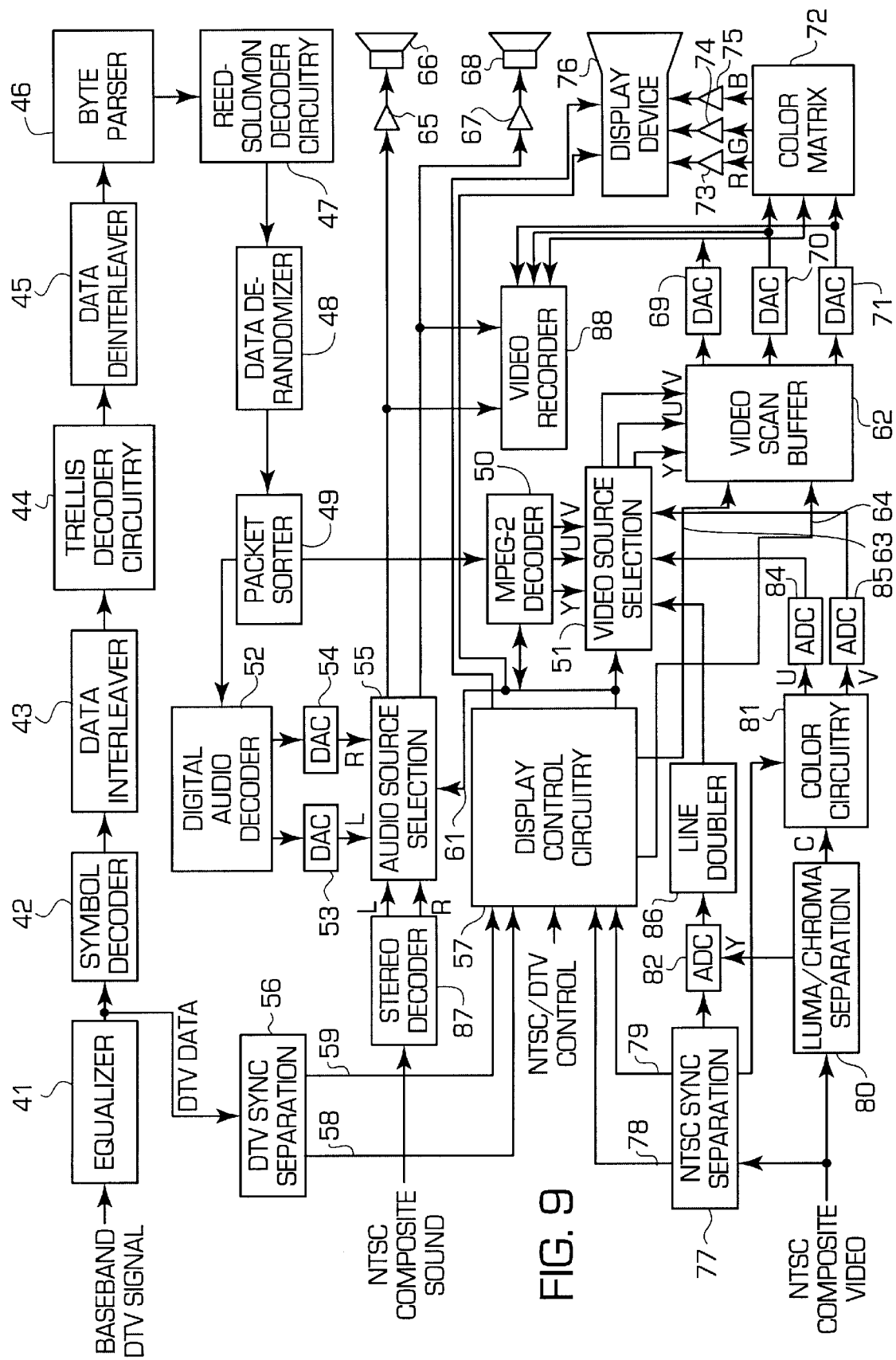
FIG. 9 is a block schematic diagram of the remaining portions of each of the receivers of FIGS. 1–8.

FIG. 9 shows the remaining portions of a television set employing radio receiver portions as shown in any one of FIGS. 1–6. An equalizer 41 receives baseband ATSC symbol code from the synchrodyne circuitry 20 and supplies equalized baseband ATSC symbol code to a symbol decoder 42. The symbol decoder 42 performs data-slicing operations on the equalized baseband ATSC symbol code to recover data in serial-bit form therefrom. These data are supplied to a data interleaver 43, which supplies interleaved data in parallel-bit form to trellis decoder circuitry 44. The trellis decoder circuitry 44 supplies output signal in parallel-bit form to a data de-interleaver 45, and the output signal from the data de-interleaver 45 is parsed into bytes by parsing circuitry 46 for application to decoder circuitry 47 for decoding Reed-Solomon forward error-correction coding. The output signal from the ReedSolomon decoder circuitry 47 is supplied to a data de-randomizer 48 which supplies packets of data to a packet sorter 49. The packet sorter 49 selects packets of video data to an MPEG-2 decoder 50, which supplies a digital luminance (Y) signal and digital chrominance (U and V) signals to video source chooser circuitry 51 in delayed response to those packets of video data. Furthers the packet sorter 49 selects packets of audio data to a digital audio decoder 52, which generates digital stereophonic audio signals supplied to digital-to-audio converters (DACs) 53 and 54. The DACs 53 and 54 convert the digital stereophonic audio signals to analog stereophonic audio signals supplied to audio source chooser circuitry 55.

The output signal from the equalizer 41 is supplied to the ATSC sync separation circuitry 56 for detecting code groups specifying the beginnings of data fields and of data segments in the datastream. The signals the ATSC sync separation circuitry 56 produces at the beginnings of the data fields are supplied to a controller 57 via a connection 58 and the signals the ATSC sync separation circuitry 56 produces at the beginnings of the data segments are supplied to the controller 57 via a connection 59. The controller 57 supplies a signal applied via a connection 60 to the video source chooser circuitry 51 for controlling its selection of video source and applied via a connection 61 to the audio source chooser circuitry 55 for controlling its selection of audio source. When DTV signal is being received, the controller 57 conditions the video source chooser circuitry 51 to select the digital luminance (Y) signal and digital chrominance (U and V) signals supplied by the MPEG-2 decoder 50 for application to a display buffer memory 62, the writing from which memory 58 is controlled by the controller 57 via a control link 63, and reading into which memory 58 is controlled by the controller 57 via a control link 64. When DTV signal is being received, the controller 57 conditions the audio source chooser circuitry 55 to select the analog stereophonic audio signals supplied by the DACs 53 and 54 for amplification by the audio amplifiers 65 and 66, which supply their respective amplifier responses to a left loudspeaker 67 and a right loudspeaker 68. The controller 57 knows DTV signal is being received when the ATSC sync separation circuitry 56 detects the beginnings of the data fields in a DTV signal. Alternatively, circuitry for detecting the sustained presence of pilot carrier in a DTV signal being currently received can be used to inform the controller 57 of DTV signal reception.

The display buffer memory 62 is read from to supply raster-scanned digital luminance (Y) signal to a digital-to-analog converter 69 and digital chrominance (U and V) signals to digital-to-analog converters 70 and 71. The resulting analog luminance (Y) signal from the digital-to-analog converter 69 and analog chrominance (U and V) signals from the digital-to-analog converters 70 and 71 are supplied to color matrixing circuitry 72 of analog type to generate red, green and blue analog color signals amplified by amplifiers 73, 74 and 75, respectively. The amplified red, green and blue color signals are supplied to a display device 76, the raster scanning of which is controlled by the controller 57. In TV receivers alternative to those diagrammed in FIG. 9, the raster-scanned digital luminance (Y) signal and digital chrominance (U and V) signals read from the display buffer memory 62 can be supplied to color matrixing circuitry of digital type to generate red, green and blue digital color signals that are then converted to red, green and blue analog color signals to be amplified by the amplifiers 73, 74 and 75, respectively.

In the analog TV portion of the receiver, the video detector 17 supplies composite video signal to NTSC sync separation circuitry 77, which supplies horizontal and vertical synchronization signals to the controller 57 via connections 78 and 79, respectively. The video detector 17 also supplies composite video signal to luminance/chrominance separation circuitry 80, which circuitry 80 separates an analog chrominance subcarrier signal for application to color circuitry 81 and separates an analog baseband luminance signal for application to an analog-to-digital converter 82. The color circuitry 81 receives a burst gate signal from the NTSC sync separation circuitry 77 via a connection 83 and responds to its input signals to supply a analog color-difference (U) signal to an analog-to-digital converter 84 and to supply another analog color-difference (V) signal to an analog-to-digital converter 85. The digitized luminance signal is supplied by the ADC 82 to a scan line doubler 86, which converts the 525 scan lines of NTSC luminance to a luminance signal having 1050 scan lines. The scan line doubler 86, the ADC 75 and the ADC 76 supply digitized Y, U and V signals to the video source chooser circuitry 51, for selection to the display buffer memory 62 when the controller 57 determines that an NTSC signal is currently being received and that no DTV signal is currently being received. The FM detector 32 supplies composite audio signal to a stereophonic decoder 87, which responds to composite audio signal for supplying stereophonic signals to the audio source chooser circuitry 55. The controller 57 receives the NTSC/DTV CONTROL signal from the threshold detector 27 and uses it to determine whether or not an NTSC signal is currently being received. When the controller 57 determines that an NTSC signal is currently being received and that no DTV signal is currently being received, the controller 57 conditions the audio source chooser circuitry 55 to supply the audio amplifiers 65 and 66 stereophonic signals responsive to those from the stereophonic decoder 87.

FIG. 9 shows a video recorder 88 being included in combination with the TV set, forming what is known in the industry as a "combo". FIG. 9 shows the analog stereophonic audio signals from the audio source chooser circuitry 55 and the analog baseband luminance and baseband chrominance signals from the DACs 69, 70 and 71 being supplied to the video recorder 88, there to be digitized again by the video recorder 88 if it is a digital rather than an analog video recorder. The arrangement of video recorder 88 permits recording of NTSC signals as well as DTV signals, which is not possible with a digital video tape recorder arranged to record packets of digital television information before decoding by the MPEG-2 video decoder 50 and the digital audio decoder 52. There are, of course, embodiments of the invention in which the elements 65–68 and 72–76 are dispensed with.

U.S. patent application Ser. No. (Attorney docket 515-3) entitled "DIGITAL, TELEVISION RECEIVERS THAT DIGITIZE FINAL I-F SIGNALS RESULTING FROM TRIPLE-CONVERSION", filed concurrently herewith by C. B. Patel and the inventor, describes considerations made when choosing the high-band intermediate frequencies and the low-band intermediate frequencies, which determines the frequency of the local oscillations supplied by the second local oscillator 4. The high IF band is at 917–923 MHz and 876 MHz second local oscillations are used in receivers similar to those used by the Grand Alliance in testing the ATSC DTV system. A 41–47 MHz low IF band exhibiting spectrum reversal from the VSB DTV signal RF transmission results, the VSB carrier being translated to just below 47 MHz. Insofar as the portion of the receiver used for receiving analog TV signals is concerned, the 41–47 MHz low IF band is the same as that conventionally used in single-conversion analog TV receivers, allowing the use of hardware already in existence. The SAW filter 14 or 014 is already available as a commercial item, for instance.

There are tighter constraints on choosing the high IF band and the low IF band, however, if the synchrodyne circuitry 20 includes a respective third mixer for DTV signals for generating a final IF band enough lower in frequency than the low IF band to be just above baseband, which final IF band is to be digitized at a multiple of the 10.76 megasample per second symbol rate. These constraints arise because of the strong preference that the carrier of the VSB DTV signal as translated to the final IF band be at a submultiple of the symbol rate or of a harmonic thereof.

If the carrier of the VSB DTV signal as translated to the final IF band is to be lower in frequency than the midband frequency of the final IF band, the third local oscillations must be closer in frequency to the VSB carrier as translated to the low IF band than the midband frequency of the low IF band. If the high IF band is at 917–923 MHz and 876 MHz second local oscillations are used, the VSB carrier is translated to just below 47 MHz in a 41–47 MHz low IF band. Because of spectrum reversal owing to the second local oscillations being below the final IF band, the requirements on offsetting the VSB carrier from zero frequency in the third IF band place the third local oscillations above 48 MHz, placing their second harmonic in the FM broadcast band. This presents some risk of interference with weak reception in a broadcast FM receiver located near the DTV receiver, owing to capture of the limiter in the FM receiver. One may prefer to locate the second IF band at a somewhat lower frequency, so the second local oscillations are below 44 MHz. (In a single-conversion television receiver the intermediate frequencies are made as high as possible, while remaining below the very-high-frequency television broadcast band and avoiding the second harmonic of NTSC sound carrier falling into the FM broadcast band, in order to prevent image frequencies from the single conversion falling too closeby the desired signal to be selected against by tuned radio-frequency amplification. There is no such constraint in a plural-conversion tuner.) Locating the low IF band at a lower frequency makes it more difficult to provide selectivity with the SAW filter 14 or 014, however, which is further reason for the SAW filter 7 or 07 in the UHF high IF band defining the overall selection characteristic of the receiver. The frequency of second oscillations can be increased to fall just above the 890 MHz upper limit frequency of channel 83, and the high IF band adjusted upward to locate the low IF band an appropriate amount below the frequency of third local oscillations reduced to below 44 MHz. For example, if the frequency of third local oscillations is chosen to be at 43.4 MHz and if the VSB carrier as translated to final IF band is at 2.69 MHz, so the final IF band is 2.4–8.4 MHz, the second IF band is at 35–41 MHz. If the frequency of second local oscillations chosen to be at 890.5 MHz, the high IF band must be at 925.5–931.5 MHz.

If the carrier of the VSB DTV signal as translated to the final IF band is to be lower in frequency than the midband frequency of the final IF band, but there is no spectrum reversal in the low IF band because of the second local oscillations being at a frequency above the high IF band, the third local oscillations will be at a frequency below the low IF band. The third harmonic of these third local oscillations preferably should be above the 88–108 MHz FM broadcast band, so the third local oscillations preferably are of a frequency somewhat above 36 MHz. The NTSC sound carrier is located near the top of the low IF band, and the second harmonic of this FM carrier should fall below the FM broadcast band, so this carrier cannot be above 43.75 MHz. If the VSB carrier as translated to final IF band is at 2.69 MHz, so the final IF band is 2.4–8.4 MHz, and the third local oscillations are at 36.6 MHz, the low IF band is at 39–45 MHz, placing the NTSC sound carrier at a frequency likely to cause interference with a broadcast FM receiver. The NTSC sound carrier is too high in frequency even if the third local oscillations are at 36.0 MHz.

If the third local oscillations are at 36.0 MHz and if the VSB carrier as translated to final IF band is at 1.35 MHz, so the final IF band is 1–7 MHz, the low IF band is at 37–44 MHz. The NTSC sound carrier is just barely low enough in frequency. If the carrier of the VSB DTV signal as translated to the final IF band is to be lower in frequency than the midband frequency of the final IF band, then, it is better to use second local oscillations of a frequency below the high IF band in frequency so there is a reversal of DTV signal frequency spectrum in the low IF band.

If the carrier of the VSB DTV signal is to be higher in frequency than the midband frequency in the final IF band, the third local oscillations must be closer in frequency to the midband frequency of the low IF band than the VSB carrier as translated to low IF band. If the VSB carrier is just above the lower limit frequency of the low IF band, owing to the second local oscillations being above the high IF band, in order for the carrier of the VSB DTV signal to be above the midband frequency in the final IF band, the third local oscillations must be above the low IF band. It is preferable that the third oscillations are lower in frequency than 44 MHz, to prevent their second harmonic falling in the FM broadcast band. Also, the NTSC sound carrier is at the top of the low IF band, and it is desirable to prevent its second harmonic falling in the FM broadcast band. If there is no spectrum reversal owing to the second local oscillations being above the high IF band and if further the third local oscillations must be above the low IF band to place the carrier of the VSB DTV signal above the midband frequency in the final IF band, the low IF band must be located lower in frequency than 41–47 MHz. If the low IF band is located lower than 36–42 Mhz, third harmonics of signals in this band overlap the top portion of the FM broadcast band. Within these constraints, the VSB carrier in the final IF band cannot be higher than 7.69 MHz. A VSB carrier that is the third subharmonic of the 21.52 second harmonic of the 10.76 megasample per second symbol rate for VSB DTV is possible and will meet this requirement. If the low IF band is located at about 36–42 MHz and has no spectrum reversal, the frequency response of the SAW filter 14 or 014 has its more gently sloped skirt at the lower frequency end. This mitigates the difficulty of designing the SAW filter to operate in a lower frequency range.

If the VSB carrier is just below the upper limit frequency of the low IF band owing to the second local oscillations being below the high IF band, in order for the carrier of the VSB DTV signal to be above the midband frequency in the final IF band, the third local oscillations must be below the low IF band. If the VSB carrier is just below 47 MHz in a 41–47 MHz second 11 band, third local oscillations below the low IF band, but above 36 MHz, have their harmonics outside the FM broadcast band. Within these constraints, the VSB carrier in the final IF band can be as high as 10.69

MHz. Locating the high IF band slightly higher in frequency allows a VSB carrier of 10.76 MHz. A 41–47 MHz low IF band is possible without the second local oscillations falling in the UHF TV broadcast band. If the frequency of second local oscillations chosen to be at 890.5 MHz, the high IF band must be at 931.5–937.5 MHz.

In the claims which follow, the word "said" is used whenever reference is made to an antecedent, and the word "the" is used for grammatical purposes other than to refer back to an antecedent.

What is claimed is:

1. A radio receiver for selectively receiving one of a plurality of television signals, some of which television signals are digital television signals transmitted by amplitude-modulation of a suppressed carrier, and some of which television signals are analog television signals comprising an amplitude-modulated video carrier and a frequency-modulated audio carrier, said radio receiver comprising:

a first detector comprising a first local oscillator for supplying first local oscillations and a first mixer for generating a first detector response to the selected one of said television signals as mixed with said first local oscillations, said first detector response including a high-band intermediate frequency signal;

a first high-band intermediate frequency amplifier for supplying a first amplified high-band intermediate frequency signal in response to said first detector response;

a second detector for said digital television signals and for the amplitude-modulated video carriers of said analog television signals, comprising a second local oscillator for supplying second local oscillations, and a second mixer for generating a first low-band intermediate frequency signal responsive to said first amplified high-band intermediate frequency signal as mixed with said second local oscillations;

circuitry for demodulating a digital television carrier sideband component of said first low-band intermediate frequency signal when a digital television signal is selected for reception; and circuitry for demodulating an amplitude-modulated video carrier component of said first low-band intermediate frequency signal when an analog television signal is selected for reception.

2. A radio receiver for selectively receiving one of a plurality of television signals, some of which television signals are digital television signals, and some of which television signals are analog television signals comprising an amplitude-modulated video carrier and a frequency-modulated audio carrier, said radio receiver comprising:

a first detector comprising a first local oscillator for supplying first local oscillations and a first mixer for generating a first detector response to the selected one of said television signals as mixed with said first local oscillations, said first detector response including a high-band intermediate frequency signal;

a first high-band intermediate frequency amplifier for supplying a first amplified high-band intermediate frequency signal in response to said first detector response;

a second detector for said digital television signals and for the amplitude-modulated video carriers of said analog television signals, generating a second detector response and comprising a second local oscillator for supplying second local oscillations, and a second mixer for generating said second detector response responsive to said first amplified high-band intermediate frequency signal, as mixed with said second local oscillations, said second detector response including a first low-band intermediate frequency signal;

a first low-band intermediate frequency amplifier for supplying a first amplified low-band intermediate-frequency signal responsive to analog-television-signal video components of said first low-band intermediate frequency signal, said first low-band intermediate frequency amplifier providing gain that is controlled in response to a first automatic-gain-control signal;

a video detector responsive to analog-television-signal video components of said first amplified low-band intermediate-frequency signal for detecting therefrom a composite video signal at baseband;

first automatic-gain-control circuitry for developing said first automatic-gain-control signal in response to said composite video signal at baseband detected by said video detector;

a second low-band intermediate frequency amplifier for supplying a second amplified low-band intermediate-frequency signal responsive to digital-television-signal components of said first low-band intermediate frequency signal in said second detector response, said second low-band intermediate frequency amplifier providing gain that is controlled in response to a second automatic-gain-control signal;

synchrodyning circuitry responsive to digital-television-signal components of said second amplified low-band intermediate-frequency signal for recovering therefrom a baseband synchrodyning result comprising symbol coding accompanied by a direct signal; and second automatic-gain-control circuitry for developing said second automatic-gain-control signal in response to said baseband synchrodyning result.

3. The radio receiver set forth in claim 2, further comprising:

a radio-frequency amplifier for providing gain to said selected one of said television signals supplied to said first mixer, which gain is controlled in response to a third automatic-gain-control signal; and delayed automatic-gain-control circuitry for generating said third automatic-gain-control signal in response to said first and second automatic-gain-control signals, said third automatic-gain-control circuitry providing delayed automatic gain control to said radio-frequency amplifier for reducing its gain when either one of said first and second automatic-gain-control signals indicates said first mixer is approaching input overload.

4. The radio receiver set forth in claim 2, further comprising:

a second high-band intermediate frequency amplifier for supplying a second amplified high-band intermediate frequency signal in response to frequency-modulated audio carrier selected from said first detector response;

a further second detector, which further second detector is for the frequency-modulated audio carriers of said analog television signals, comprising, in addition to said second local oscillator, a further mixer for generating a further mixer response responsive to said second amplified high-band intermediate frequency signal as mixed with said second local oscillations, said further mixer response including a second low-band intermediate frequency signal;

a third low-band intermediate frequency amplifier for supplying a third amplified low-band intermediate-frequency signal responsive to analog-television-signal audio components of said second low-band intermediate frequency signal in said second second-detector response, said third low-band intermediate frequency amplifier providing gain that is controlled in response to said first automatic-gain-control signal.

5. The radio receiver set forth in claim 4, further comprising:

a still further mixer for generating an intercarrier sound signal responsive to said third amplified low-band intermediate-frequency signal as mixed with said video carrier extracted from said first amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

6. The radio receiver set forth in claim 4, further comprising:

a still further mixer for generating an intercarrier sound signal responsive to said third amplified low-band intermediate-frequency signal as mixed with said video carrier extracted from said second amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

7. The radio receiver set forth in claim 2, further comprising:

a second high-band intermediate frequency amplifier for supplying a second amplified high-band intermediate frequency signal in response to analog-television-signal frequency-modulated-audio-carrier and amplitude-modulated-video-carrier components selected from said first detector response;

a further second detector, which further second detector is for the frequency-modulated audio carriers of said analog television signals, comprising, in addition to said second local oscillator, a further mixer for generating a further mixer response responsive to said second amplified high-band intermediate frequency signal as mixed with said second local oscillations, said further mixer response including a second low-band intermediate frequency signal;

a third low-band intermediate frequency amplifier for supplying a third amplified low-band intermediate-frequency signal responsive to analog-television-signal frequency-modulated-audio-carrier and amplitude-modulated-video-carrier components of said first low-band intermediate frequency signal in said further mixer response, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

8. The radio receiver set forth in claim 2, further comprising:

a third low-band intermediate frequency amplifier for supplying a third amplified low-band intermediate-frequency signal responsive to analog-television-signal audio components of said first low-band intermediate frequency signal in said second detector response, said third low-band intermediate frequency amplifier providing gain that is controlled in response to said first automatic-gain-control signal;

a still further mixer for generating an intercarrier sound signal responsive to said third amplified low-band intermediate-frequency signal as mixed with said video carrier extracted from said first amplified low-band intermediate-frequency signals;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

9. The radio receiver set forth in claim 2, wherein said second detector for said digital television signals and for the amplitude-modulated video carriers of said analog television signals is also the same second detector for the frequency-modulated audio carriers of said analog television signals, said radio receiver further comprising:

a third low-band intermediate frequency amplifier for supplying a third amplified low-band intermediate-frequency signal responsive to analog-television-signal audio components of said first low-band intermediate frequency signal in said second detector response, said third low-band intermediate frequency amplifier providing gain that is controlled in response to said first automatic-gain-control signal;

a still further mixer for generating an intercarrier sound signal responsive to said third amplified low-band intermediate-frequency signal as mixed with said video carrier extracted from said second amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

10. The radio receiver set forth in claim 2, wherein said second detector for said digital television signals and for the amplitude-modulated video carriers of said analog television signals is also the same second detector for the frequency-modulated audio carriers of said analog television signals, said radio receiver further comprising:

a third low-band intermediate frequency amplifier for supplying a third amplified low-band intermediate-frequency signal responsive to analog-television-signal frequency-modulated-audio-carrier and amplitudemodulated-video-carrier components of said first low-band intermediate frequency signal in said second detector response, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

11. A radio receiver for selectively receiving one of a plurality of television signals, some of which television signals are digital television signals, and some of which television signals are analog television signals comprising an amplitude-modulated video carrier and a frequency-modulated audio carrier, said radio receiver comprising:

a first detector comprising a first local oscillator for supplying first local oscillations and a first mixer for generating a first detector response to the selected one of said television signals as mixed with said first local oscillations, said first detector response including a high-band intermediate frequency signal;

a first surface-acoustic-wave filter for supplying responsive to a high-band intermediate-frequency input signal thereto a first surface-acoustic-wave filter response having essentially flat amplitude and linear delay over a bandwidth of at least 5.4 MHz;

a first buffer amplifier responsive to the high-band intermediate frequency signal included in said first detector response for supplying the high-band intermediate frequency input signal to said first surface-acoustic-wave filter from a source impedance avoiding undesirable multiple reflections and for supplying gain to overcome the midband insertion loss of said first surface-acoustic-wave filter; and a second detector for said digital television signals and for the amplitude-modulated video carriers of said analog television signals, comprising a second local oscillator for supplying second local oscillations, and a second mixer for generating a first low-band intermediate frequency signal responsive to said first surface-acoustic-wave filter response, as mixed with said second local oscillations.

12. The radio receiver set forth in claim 11, wherein said first local oscillator is of a type in which the frequency of said first local oscillations is adjustable in response to an automatic-fine-tuning signal, said radio receiver further comprising:

a first low-band intermediate frequency amplifier for supplying a first amplified low-band intermediate-frequency signal responsive to analog-television-signal video components of said first low-band intermediate frequency signal in said second detector response;

a video detector responsive to analog-television-signal video components of said first amplified low-band intermediate-frequency signal for detecting therefrom a composite video signal at baseband;

a second low-band intermediate frequency amplifier for supplying a second amplified low-band intermediate-frequency signal responsive to digital-television-signal components of said first low-band intermediate frequency signal in said second detector response;

synchrodyning circuitry responsive to digital-television-signal components of said second amplified low-band intermediate-frequency signal for recovering therefrom a baseband synchrodyning result comprising symbol coding accompanied by a direct signal;

a first automatic-fine-tuning detector for responding to analog-television-signal video carrier in said first amplified low-band intermediate-frequency signal for generating a first automatic-fine-tuning signal;

a second automatic-fine-tuning detector for responding to digital-television-signal pilot carrier in said second amplified low-band intermediate-frequency signal for generating a second automatic-fine-tuning signal; and an automatic-fine-tuning selector for applying said first automatic-fine-tuning signal to said first local oscillator when an analog television signal is received and for applying said second automatic-fine-tuning signal to said first local oscillator when an analog television signal is not received.

13. The radio receiver set forth in claim 12, wherein said first low-band intermediate frequency amplifier provides gain that is controlled in response to a first automatic-gain-control signal so as to secure substantially as low noise figure as possible, and wherein said second low-band intermediate frequency amplifier provides gain that is controlled in response to a second automatic-gain-control signal so as to secure linear gain, said radio receiver further comprising:

first automatic-gain-control circuitry for developing said first automatic-gain-control signal in response to said composite video signal at baseband detected by said video detector; and second automatic-gain-control circuitry for developing said second automatic-gain-control signal in response to said baseband synchrodyning result.

14. The radio receiver set forth in claim 13, wherein said first surface-acoustic-wave filter response is substantially non-responsive to the frequency-modulated audio carrier of an analog television signal, said radio receiver further comprising:

a second high-band intermediate frequency amplifier for supplying a second amplified high-band intermediate frequency signal in response to frequency-modulated audio carrier selected from said first detector response; and a further second detector, which further second detector is for the frequency-modulated audio carriers of said analog television signals comprising, in addition to said second local oscillator, a further mixer for generating a second low-band intermediate frequency signal responsive to said second amplified high-band intermediate frequency signal as mixed with said second local oscillations.

15. The radio receiver set forth in claim 14, further comprising:

a third low-band intermediate frequency amplifier for supplying a third amplified low-band intermediate-frequency signal responsive to analog-television-signal audio components of said second low-band intermediate frequency signal in said second second-detector response, said third low-band intermediate frequency amplifier providing gain that is controlled in response to said first automatic-gain-control signal;

a still further mixer for generating an intercarrier sound signal responsive to said third amplified low-band intermediate-frequency signal as mixed with said video carrier extracted from one of said first and second amplified low-band intermediate-frequency signals;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

16. The radio receiver set forth in claim 15, wherein said still further mixer is connected for generating said intercarrier sound signal responsive to said third amplified low-band intermediate-frequency signal as mixed with said video carrier extracted from said first amplified low-band intermediate-frequency signal.

17. The radio receiver set forth in claim 15, wherein said second high-band intermediate frequency amplifier comprises:

a second surface-acoustic-wave filter for supplying a second surface-acoustic-wave filter response separating frequency-modulated audio carrier component from a high-band intermediate-frequency input signal thereto; and a second buffer amplifier responsive to the high-band intermediate frequency signal included in said first detector response for supplying the high-band intermediate frequency input signal to said second surface-acoustic-wave filter from a source impedance avoiding undesirable multiple reflections and for supplying gain to overcome the insertion loss of said second surface-acoustic-wave filter for said frequency-modulated audio carrier component.

18. The radio receiver set forth in claim 14, further comprising:

a third low-band intermediate frequency amplifier for supplying a third amplified low-band intermediate-frequency signal responsive to analog-television-signal frequency-modulated-audio-carrier and amplitude-modulated-video-carrier components of said second low-band intermediate frequency signal, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

19. The radio receiver set forth in claim 18, wherein said second high-band intermediate frequency amplifier comprises:

a second surface-acoustic-wave filter for supplying a second surface-acoustic-wave filter response to frequency-modulated audio carrier component and to amplitude-modulated video carrier component from a high-band intermediate-frequency input signal thereto, which response has a dip for chrominance signal components of said high-band intermediate-frequency input signal; and a second buffer amplifier responsive to the high-band intermediate frequency signal included in said first detector response for supplying the high-band intermediate frequency input signal to said second surface-acoustic-wave filter from a source impedance avoiding undesirable multiple reflections and for supplying gain to overcome the insertion loss of said second surface-acoustic-wave filter for said frequency-modulated audio carrier component and said amplitude-modulated video carrier component.

20. The radio receiver set forth in claim 13, wherein said first surface-acoustic-wave filter response exhibits response to the frequency-modulated audio carrier of an analog television signal as well as to the amplitude-modulated video carrier of the analog television signal and to a digital television signal, said radio receiver further comprising:

a third low-band intermediate frequency amplifier for supplying a third amplified low-band intermediate-frequency signal responsive to analog-television-signal audio components of said first low-band intermediate frequency signal in said first second-detector response, said third low-band intermediate frequency amplifier providing gain that is controlled in response to said first automatic-gain-control signal;

a still further mixer for generating an intercarrier sound signal responsive to said third amplified low-band intermediate-frequency signal as mixed with said video carrier extracted from one of said first and second amplified low-band intermediate-frequency signals;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

21. The radio receiver set forth in claim 20, wherein said still further mixer is connected for generating said intercarrier sound signal responsive to said third amplified low-band intermediate-frequency signal as mixed with said video carrier extracted from said first amplified low-band intermediate-frequency signal.

22. The radio receiver set forth in claim 13, wherein said first surface-acoustic-wave filter response exhibits response to the frequency-modulated audio carrier of an analog television signal as well as to the amplitude-modulated video carrier of the analog television signal and to a digital television signal, said radio receiver further comprising:

a third low-band intermediate frequency amplifier for supplying a third amplified low-band intermediate-frequency signal responsive to analog-television-signal frequency-modulated-audio-carrier and amplitude-modulated-video-carrier components of said first low-band intermediate frequency signal in said second detector response, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

23. The radio receiver set forth in claim 11, wherein said first local oscillator is of a type in which the frequency of said first local oscillations is adjustable in response to an automatic-fine-tuning signal, said radio receiver further comprising:

a first low-band intermediate frequency amplifier for supplying a first amplified low-band intermediate-frequency signal responsive to analog-television-signal video components of said first low-band intermediate frequency signal in a second detector response;

a video detector responsive to analog-television-signal video components of said first amplified low-band intermediate-frequency signal for detecting therefrom a composite video signal at baseband;

a second low-band intermediate frequency amplifier for supplying a second amplified low-band intermediate-frequency signal responsive to digital-television-signal components of said first low-band intermediate frequency signal in said first second-detector response;

synchrodyning circuitry responsive to digital-television-signal components of said second amplified low-band intermediate-frequency signal for recovering therefrom a baseband synchrodyning result comprising symbol coding accompanied by a direct signal;

a first automatic-fine-tuning detector for responding to analog-television-signal video carrier in said second amplified low-band intermediate-frequency signal for generating a first automatic-fine-tuning signal;

a second automatic-fine-tuning detector for responding to digital-television-signal pilot carrier in said second amplified low-band intermediate-frequency signal for generating a second automatic-fine-tuning signal; and an automatic-fine-tuning selector for applying said first automatic-fine-tuning signal to said first local oscillator when an analog television signal is received and for applying said second automatic-fine-tuning signal to said first local oscillator when an analog television signal is not received.

24. The radio receiver set forth in claim 23, wherein said first low-band intermediate frequency amplifier provides gain that is controlled in response to a first automatic-gain-control signal so as to secure substantially as low noise figure as possible, and wherein said second low-band intermediate frequency amplifier provides gain that is controlled in response to a second automatic-gain-control signal so as to secure linear gain, said radio receiver further comprising:

first automatic-gain-control circuitry for developing said first automatic-gain-control signal in response to said composite video signal at baseband detected by said video detector; and second automatic-gain-control circuitry for developing said second automatic-gain-control signal in response to said baseband synchrodyning result.

25. The radio receiver set forth in claim 24, wherein said first surface-acoustic-wave filter response is substantially non-responsive to the frequency-modulated audio carrier of an analog television signal, said radio receiver further comprising:

a second high-band intermediate frequency amplifier for supplying a second amplified high-band intermediate frequency signal in response to frequency-modulated audio carrier selected from said first detector response; and a further second detector, which further second detector is for the frequency-modulated audio carriers of said analog television signals comprising, in addition to said second local oscillator, a further mixer for generating a second low-band intermediate frequency signal responsive to said second amplified high-band intermediate frequency signal as mixed with said second local oscillations.

26. The radio receiver set forth in claim 25, further comprising:

a third low-band intermediate frequency amplifier for supplying a third amplified low-band intermediate-frequency signal responsive to analog-television-signal audio components of said second low-band intermediate frequency signal, said third low-band intermediate frequency amplifier providing gain that is controlled in response to said first automatic-gain-control signal;

a still further mixer for generating an intercarrier sound signal responsive to said third amplified low-band intermediate-frequency signal as mixed with said video carrier extracted from one of said first and second amplified low-band intermediate-frequency signals;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

27. The radio receiver set forth in claim 26, wherein said still further mixer is connected for generating said intercarrier sound signal responsive to said third amplified low-band intermediate-frequency signal as mixed with said video carrier extracted from said first amplified low-band intermediate-frequency signal.

28. The radio receiver set forth in claim 26, wherein said second high-band intermediate frequency amplifier comprises:

a second surface-acoustic-wave filter for supplying a second surface-acoustic-wave filter response separating frequency-modulated audio carrier component from a high-band intermediate-frequency input signal thereto; and a second buffer amplifier responsive to the high-band intermediate frequency signal included in said first detector response for supplying the high-band intermediate frequency input signal to said second surface-acoustic-wave filter from a source impedance avoiding undesirable multiple reflections and for supplying gain to overcome the insertion loss of said second surface-acoustic-wave filter for said frequency-modulated audio carrier component.

29. The radio receiver set forth in claim 25, further comprising:

a third low-band intermediate frequency amplifier for supplying a third amplified low-band intermediate-frequency signal responsive to analog-television-signal frequency-modulated-audio-carrier and amplitude-modulated-video-carrier components of said second low-band intermediate frequency signal, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

30. The radio receiver set forth in claim 29, wherein said second high-band intermediate frequency amplifier comprises:

a second surface-acoustic-wave filter for supplying a second surface-acoustic-wave filter response to frequency-modulated audio carrier component and to amplitude-modulated video carrier component from a high-band intermediate-frequency input signal thereto, which response has a dip for chrominance signal components of said high-band intermediate-frequency input signal; and a second buffer amplifier responsive to the high-band intermediate frequency signal included in said first detector response for supplying the high-band intermediate frequency input signal to said second surface-acoustic-wave filter from a source impedance avoiding undesirable multiple reflections and for supplying gain to overcome the insertion loss of said second surface-acoustic-wave filter for said frequency-modulated audio carrier component and said amplitude-modulated video carrier component.

31. The radio receiver set forth in claim 24, wherein said first surface-acoustic-wave filter response exhibits response to the frequency-modulated audio carrier of an analog television signal as well as to the amplitude-modulated video carrier of the analog television signal and to a digital television signal, said radio receiver further comprising:

a third low-band intermediate frequency amplifier for supplying a third amplified low-band intermediate-frequency signal responsive to analog-television-signal audio components of said first low-band intermediate frequency signal in a second detector response, said third low-band intermediate frequency amplifier providing gain that is controlled in response to said first automatic-gain-control signal;

a further mixer for generating an intercarrier sound signal responsive to said third amplified low-band intermediate-frequency signal as mixed with said video carrier extracted from one of said first and second amplified low-band intermediate-frequency signals;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

32. The radio receiver set forth in claim 31, wherein said further mixer is connected for generating said intercarrier sound signal responsive to said third amplified low-band intermediate-frequency signal as mixed with said video carrier extracted from said first amplified low-band intermediate-frequency signal.

33. The radio receiver set forth in claim 24, wherein said first surface-acoustic-wave filter response exhibits response to the frequency-modulated audio carrier of an analog television signal as well as to the amplitude-modulated video carrier of the analog television signal and to a digital television signal, said radio receiver further comprising:

a third low-band intermediate frequency amplifier for supplying a third amplified low-band intermediate-frequency signal responsive to analog-television-signal frequency-modulated-audio-carrier and amplitude-modulated-video-carrier components of said first low-band intermediate frequency signal in a second detector response, said third low-band intermediate frequency amplifier providing gain that is controlled in response to said first automatic-gain-control signal;

an intercarrier sound detector for detecting an intercarrier sound signal in response to said third amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

34. The radio receiver set forth in claim 1, wherein said circuitry for demodulating a digital television carrier sideband component of said low-band intermediate frequency signal is of a type for demodulating a vestigial-sideband component of the digital television carrier when a vestigial-sideband digital television signal is selected for reception.

35. The radio receiver set forth in claim 1, wherein said circuitry for demodulating a digital television carrier sideband component of said low-band intermediate frequency signal is of a type for synchrodyning said low-band intermediate frequency signal to baseband when a vestigial-sideband digital television signal is selected for reception.

36. The radio receiver set forth in claim 1, further comprising:

a second high-band intermediate frequency amplifier for supplying a second amplified high-band intermediate frequency signal in response to analog-television-signal frequency-modulated-audio-carrier and amplitude-modulated-video-carrier components selected from said first detector response;

a further mixer for generating a further mixer response responsive to said second amplified high-band intermediate frequency signal as mixed with said second local oscillations;

a low-band intermediate frequency amplifier for supplying a second low-band intermediate-frequency signal responsive to said further mixer response; and circuitry for demodulating a frequency-modulated audio carrier component of said second low-band intermediate frequency signal when an analog television signal is selected for reception.

37. The radio receiver set forth in claim 36, wherein said circuitry for demodulating a frequency-modulated audio carrier component of said second low-band intermediate frequency signal comprises:

an intercarrier sound detector for detecting an intercarrier sound signal in response to said second low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

38. The radio receiver set forth in claim 37, wherein said second high-band intermediate frequency amplifier includes a filter for supplying response to said high-band intermediate-frequency signal that exhibits peaks near the video carrier frequency and the audio carrier frequency of said high-band intermediate-frequency signal when an analog television signal is selected for reception.

39. A radio receiver for selectively receiving one of a plurality of television signals, some of which television signals are digital television signals transmitted by amplitude-modulation of a suppressed carrier, and some of which television signals are analog television signals comprising an amplitude-modulated video carrier and a frequency-modulated audio carrier, said radio receiver comprising:

a first detector comprising a first local oscillator for supplying first local oscillations and a first mixer for generating a first detector response to the selected one of said television signals as mixed with said first local oscillations, said first detector response including a high-band intermediate frequency signal;

a first high-band intermediate frequency amplifier for supplying a first amplified high-band intermediate frequency signal in response to said first detector response;

a second local oscillator for supplying second local oscillations;

a second mixer for generating a first low-band intermediate frequency signal responsive to said first amplified high-band intermediate frequency signal as mixed with said second local oscillations;

a first low-band intermediate frequency amplifier for supplying a first amplified low-band intermediate-frequency signal responsive to said first low-band intermediate frequency signal generated by said second mixer;

circuitry for demodulating an amplitude-modulated video carrier component of said first amplified low-band intermediate frequency signal when an analog television signal is selected for reception, thereby to recover a composite video signal with a baseband luminance signal component;

a second high-band intermediate frequency amplifier for supplying a second amplified high-band intermediate frequency signal in response to analog-television-signal frequency-modulated-audio-carrier and amplitude-modulated-video-carrier components selected from said first detector response;

a further mixer for generating a further mixer response responsive to said second amplified high-band intermediate frequency signal as mixed with said second local oscillations;

a second low-band intermediate frequency amplifier for supplying a second amplified low-band intermediate-frequency signal responsive to a second low-band intermediate frequency signal in said further mixer response;

circuitry for demodulating a frequency-modulated audio carrier component of said second amplified low-band intermediate frequency signal when an analog television signal is selected for reception;

a third low-band intermediate frequency amplifier for supplying a third amplified low-band intermediate-frequency signal responsive to said first low-band intermediate frequency signal generated by said second mixer; and circuitry for demodulating a digital television carrier sideband component of said third amplified low-band intermediate frequency signal when a digital television signal is selected for reception, thereby to recover baseband symbol coding.

40. The radio receiver set forth in claim 39, wherein said circuitry for demodulating a frequency-modulated audio carrier component of said second low-band intermediate frequency signal comprises:

an intercarrier sound detector for detecting an intercarrier sound signal in response to said second low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

41. The radio receiver set forth in claim 39, wherein said circuitry for demodulating a frequency-modulated audio carrier component of said second low-band intermediate frequency signal comprises:

an intercarrier sound detector for detecting an intercarrier sound signal in response to said second low-band intermediate-frequency signal as mixed with said first low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

42. The radio receiver set forth in claim 39, wherein said first and second low-band intermediate frequency amplifiers have respective gains both of which are controlled by a first automatic-gain-control signal, said radio receiver further comprising a first automatic gain control detector for developing said first automatic-gain-control signal responsive to portions of said composite video signal recovered by said circuitry for demodulating an amplitude-modulated video carrier component of said amplified low-band intermediate frequency signal.

43. The radio receiver set forth in claim 42, wherein said third low-band intermediate frequency amplifier has its gain controlled by a second automatic-gain-control signal, said radio receiver further comprising a second automatic gain control detector for developing said second automatic-gain-control signal responsive to said baseband symbol coding recovered by said circuitry for demodulating a digital television carrier sideband component of said third amplified low-band intermediate frequency signal.

44. The radio receiver set forth in claim 39, wherein said third low-band intermediate frequency amplifier has its gain controlled by an automatic-gain-control signal, said radio receiver further comprising an automatic gain control detector for developing said automatic-gain-control signal responsive to said baseband symbol coding recovered by said circuitry for demodulating a digital television carrier sideband component of said third amplified low-band intermediate frequency signal.

45. A radio receiver for selectively receiving one of a plurality of television signals, some of which television signals are digital television signals transmitted by amplitude-modulation of a suppressed carrier, and some of which television signals are analog television signals comprising an amplitude-modulated video carrier and a frequency-modulated audio carrier, said radio receiver comprising:

a first detector comprising a first local oscillator for supplying first local oscillations and a first mixer for generating a first detector response to the selected one of said television signals as mixed with said first local oscillations, said first detector response including a high-band intermediate frequency signal;

a high-band intermediate frequency amplifier for supplying aa amplified high-band intermediate frequency signal in response to said first detector response;

a second local oscillator for supplying second local oscillations;

a second mixer for generating a low-band intermediate frequency signal responsive to said amplified high-band intermediate frequency signal as mixed with said second local oscillations;

a first low-band intermediate frequency amplifier for supplying a first amplified low-band intermediate-frequency signal responsive to said low-band intermediate frequency signal generated by said second mixer;

circuitry for demodulating an amplitude-modulated video carrier component of said first amplified low-band intermediate frequency signal when an analog television signal is selected for reception, thereby to recover a composite video signal with a baseband luminance signal component;

a second low-band intermediate frequency amplifier for supplying a second amplified low-band intermediate-frequency signal responsive to said low-band intermediate frequency signal generated by said second mixer;

circuitry for demodulating a frequency-modulated audio carrier component of said second low-band intermediate frequency signal when an analog television signal is selected for reception;

a third low-band intermediate frequency amplifier for supplying a third amplified low-band intermediate-frequency signal responsive to said low-band intermediate frequency signal generated by said second mixer; and circuitry for demodulating a digital television carrier sideband component of said third amplified low-band intermediate frequency signal when a digital television signal is selected for reception, thereby to recover baseband symbol coding.

46. The radio receiver set forth in claim 45, wherein said circuitry for demodulating a frequency-modulated audio carrier component of said second low-band intermediate frequency signal comprises:

an intercarrier sound detector for detecting an intercarrier sound signal in response to said second amplified low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

47. The radio receiver set forth in claim 46, wherein said second low-band intermediate frequency amplifier includes a filter for supplying response to said low-band intermediate-frequency signal that exhibits peaks near the video carrier frequency and the audio carrier frequency of said low-band intermediate-frequency signal when an analog television signal is selected for reception.

48. The radio receiver set forth in claim 47, wherein said circuitry for demodulating a frequency-modulated audio carrier component of said second low-band intermediate frequency signal comprises:

an intercarrier sound detector for detecting an intercarrier sound signal in response to said second low-band intermediate-frequency signal as mixed with said first low-band intermediate-frequency signal;

an intercarrier-sound intermediate-frequency amplifier for supplying an amplified and limited response to said intercarrier sound signal; and an FM detector for recovering a baseband audio signal from the response of said intercarrier-sound intermediate-frequency amplifier.

49. The radio receiver set forth in claim 45, wherein said first and second low-band intermediate frequency amplifiers have respective gains both of which are controlled by a first automatic-gain-control signal, said radio receiver further comprising a first automatic gain control detector for developing said first automatic-gain-control signal responsive to portions of said composite video signal recovered by said circuitry for demodulating an amplitude-modulated video carrier component of said amplified low-band intermediate frequency signal.

50. The radio receiver set forth in claim 49, wherein said third low-band intermediate frequency amplifier has its gain controlled by a second automatic-gain-control signal, said radio receiver further comprising a second automatic gain control detector for developing said second automatic-gain-control signal responsive to said baseband symbol coding recovered by said circuitry for demodulating a digital television carrier sideband component of said third amplified low-band intermediate frequency signal.

51. The radio receiver set forth in claim 45, wherein said third low-band intermediate frequency amplifier has its gain controlled by an automatic-gain-control signal, said radio receiver further comprising an automatic gain control detector for developing said automatic-gain-control signal responsive to said baseband symbol coding recovered by said circuitry for demodulating a digital television carrier sideband component of said third amplified low-band intermediate frequency signal.

* * * * *